United States Patent
Yamakawa et al.

(10) Patent No.: US 12,521,325 B2
(45) Date of Patent: Jan. 13, 2026

(54) FRAGRANCE COMPOSITION, SCENT DISPENSER AND METHOD FOR REDUCING MALODOR

(71) Applicant: Kao Corporation, Tokyo (JP)

(72) Inventors: Takeshi Yamakawa, Tokyo (JP); Beate Herzog-Renker, Darmstadt (DE)

(73) Assignee: Kao Corporation, Tokyo (JP)

( * ) Notice: Subject to any disclaimer, the term of this patent is extended or adjusted under 35 U.S.C. 154(b) by 718 days.

(21) Appl. No.: 17/791,584

(22) PCT Filed: Jan. 22, 2021

(86) PCT No.: PCT/JP2021/002300
§ 371 (c)(1),
(2) Date: Jul. 8, 2022

(87) PCT Pub. No.: WO2021/149813
PCT Pub. Date: Jul. 29, 2021

(65) Prior Publication Data
US 2023/0050755 A1    Feb. 16, 2023

(30) Foreign Application Priority Data

Jan. 22, 2020  (JP) ................................. 2020-008784

(51) Int. Cl.
| | |
|---|---|
| A61K 8/04 | (2006.01) |
| A61K 8/34 | (2006.01) |
| A61K 8/37 | (2006.01) |
| A61K 8/46 | (2006.01) |
| A61Q 13/00 | (2006.01) |

(52) U.S. Cl.
CPC ............... *A61K 8/046* (2013.01); *A61K 8/34* (2013.01); *A61K 8/37* (2013.01); *A61K 8/46* (2013.01); *A61Q 13/00* (2013.01); *A61K 2800/87* (2013.01)

(58) Field of Classification Search
None
See application file for complete search history.

(56) References Cited

U.S. PATENT DOCUMENTS

| | | |
|---|---|---|
| 5,942,217 A | 8/1999 | Woo et al. |
| 2003/0180238 A1 | 9/2003 | Sakurai et al. |
| 2006/0160719 A1 | 7/2006 | Emura et al. |
| 2006/0207037 A1 | 9/2006 | Fadel et al. |
| 2008/0213451 A1 | 9/2008 | Ogura et al. |
| 2011/0104092 A1 | 5/2011 | Panten et al. |
| 2013/0287707 A1 | 10/2013 | Zaizen et al. |
| 2014/0170101 A1 | 6/2014 | Cetti et al. |
| 2014/0170102 A1 | 6/2014 | Cetti et al. |
| 2014/0170194 A1 | 6/2014 | Cetti et al. |
| 2014/0179722 A1 | 6/2014 | Cetti et al. |
| 2014/0179748 A1 | 6/2014 | Cetti et al. |
| 2016/0089469 A1 | 3/2016 | Wetterer et al. |
| 2016/0354504 A1 | 12/2016 | Sasaki et al. |
| 2017/0022458 A1 | 1/2017 | Trujillo et al. |
| 2017/0233679 A1 | 8/2017 | Cetti et al. |
| 2017/0291884 A1 | 10/2017 | Wetterer et al. |
| 2017/0312204 A1 | 11/2017 | Cetti et al. |
| 2017/0312383 A1 | 11/2017 | Wetterer et al. |
| 2018/0071188 A1 | 3/2018 | Barhoum et al. |
| 2018/0180600 A1 | 6/2018 | Yoshikawa et al. |
| 2018/0207074 A1 | 7/2018 | Cetti et al. |
| 2019/0038529 A1 | 2/2019 | Manneck et al. |
| 2019/0070086 A1 | 3/2019 | Cetti et al. |
| 2020/0146960 A1 | 5/2020 | Cetti et al. |
| 2021/0177721 A1 | 6/2021 | Cetti et al. |

FOREIGN PATENT DOCUMENTS

| | | |
|---|---|---|
| CN | 1446532 A | 10/2003 |
| CN | 101990572 A | 3/2011 |
| CN | 106236606 A | 12/2016 |
| CN | 107072900 A | 8/2017 |
| EP | 1 944 354 A1 | 7/2008 |
| EP | 3 295 925 A1 | 3/2018 |
| FR | 2 908 419 A1 | 5/2008 |
| JP | 2003137758 A * | 5/2003 |
| JP | 2005-225761 A | 8/2005 |
| JP | 2015-537099 A | 12/2015 |
| WO | WO 2014/131469 A1 | 9/2014 |
| WO | WO 2016/204211 A1 | 12/2016 |
| WO | WO 2017/108362 A1 | 6/2017 |
| WO | WO 2018/041508 A1 | 3/2018 |

OTHER PUBLICATIONS

English translation of JP-2003137758-A. (Year: 2003).*
Millipore Sigma, "cis-3-Hexen-1-ol", accessed Apr. 15, 2025. (Year: 2025).*
Millipore Sigma, "p-Metha-8-thiol-3-one", accessed Apr. 15, 2025. (Year: 2025).*

* cited by examiner

*Primary Examiner* — David J Blanchard
*Assistant Examiner* — Kaeleigh E Olsen
(74) *Attorney, Agent, or Firm* — Oblon, McClelland, Maier & Neustadt, L.L.P.

(57) ABSTRACT

A fragrance composition which reduces malodor during chemical treatment of keratin fibers is described. The keratin fibers may be human keratin fibers, such as human hair. The fragrance compound comprises p-mentha-8-thiol-3-one, cis-3-hexenol, cis-3-hexenyl acetate, and allyl amyl glycolate and further comprises one or more organic solvents selected from the group consisting of benzyl alcohol, dipropylene glycol, isopropyl myristate, and ethanol in an amount of 1% by weight or more, calculated to the total weight of the composition.

21 Claims, No Drawings

FRAGRANCE COMPOSITION, SCENT DISPENSER AND METHOD FOR REDUCING MALODOR

FIELD OF INVENTION

The present invention is directed to a fragrance composition, an absorbent solid substrate being impregnated with or entrapping the fragrance, a fragrance container, a scent dispenser, and method for reducing malodor, in particular for reducing malodor in closed rooms caused by chemical treatments of keratin fibers.

BACKGROUND OF INVENTION

Chemical treatments of keratin fibers, in particular of hair, are widely employed to change the appearance of the fibers including their shape and color. Especially in hair salons, a plurality of chemical treatments are performed every day. A common disadvantage of chemical treatments is the malodor created by them leading to unpleasant olfactory reactions by customers and professionals alike.

Cosmetic industry has tackled these challenges and developed processes to reduce the production of malodor during certain types of chemical treatments (Patent Literatures 1 and 2). However, this solution may not be satisfactory for treatments involving the application of, for example, sulfur-based reducing agents or ammonia and/or ammonium salts.

Another possibility besides reducing the production of malodor is to modulate the perception of malodor by fragrance compounds.

It is known that receptors for specific types of malodors exist. OR4S2 receptor, for example, has been found responsible for detecting the smell of sulfur-based compounds of certain structures (Patent Literature 3).

However, despite the attempts of the prior art, it is further necessary to find fragrance compositions and mechanisms to reduce the perception of many kinds of different malodors created by chemical treatments of keratin fibers, such as sulfur-based reducing agents.

(Patent Literature 1) WO 2018/041508
(Patent Literature 2) WO 2014/131469
(Patent Literature 3) WO2016/204211

SUMMARY OF INVENTION

Thus, the object of the present invention is a fragrance composition for reducing malodor during chemical treatments of keratin fibers, preferably human keratin fibers, more preferably human hair, comprising the following compounds a), b), c) and e) and one or more organic solvents selected from the group consisting of benzyl alcohol, dipropylene glycol, isopropyl myristate, and ethanol in an amount of 1% by weight or more calculated to the total weight of the composition:
 a) p-mentha-8-thiol-3-one,
 b) cis-3-hexenol,
 c) cis-3-hexenyl acetate,
 e) allyl amyl glycolate.

The second object of the present invention is an absorbent solid substrate being impregnated with or entrapping the composition as defined above.

DETAILED DESCRIPTION OF INVENTION

Inventors of the present invention have unexpectedly found out that the combination of certain fragrance compounds reduces the perception of sulfur-based malodor during chemical treatments of keratin fibers. Furthermore, malodor of chemical straightening treatments is perceived less as well. The fragrance compounds were either absorbed onto solid substrates or were vaporized in closed rooms and human respondents rated the resulting experience while performing chemical treatments of hair to be significantly less unpleasant.

Fragrance Composition

The present invention is directed to a fragrance composition for reducing malodor during chemical treatments of keratin fibers, preferably human keratin fibers, more preferably human hair, comprising: a combination of compound a) and at least two or more different compounds selected from the group of b)-e).
 a) p-mentha-8-thiol-3-one,
 b) cis-3-hexenol,
 c) cis-3-hexenyl acetate,
 d) cis-3-hexenyl isobutyrate,
 e) allyl amyl glycolate.

In one aspect of the invention, the present invention is a fragrance composition comprising in the following:
 a) p-mentha-8-thiol-3-one,
 b) cis-3-hexenol,
 c) cis-3-hexenyl acetate,
 e) allyl amyl glycolate.

In other aspect of the invention, the present invention is a fragrance composition comprising in the following:
 a) p-mentha-8-thiol-3-one,
 b) cis-3-hexenol,
 c) cis-3-hexenyl acetate.

In another aspect of the invention, the present invention is a fragrance composition comprising in the following:
 a) p-mentha-8-thiol-3-one,
 b) cis-3-hexenol,
 e) allyl amyl glycolate.

In some aspect of the invention, the present invention is a fragrance composition comprising in the following:
 a) p-mentha-8-thiol-3-one,
 c) cis-3-hexenyl acetate,
 e) allyl amyl glycolate.

In some other aspect of the invention, the present invention is a fragrance composition comprising in the following:
 a) p-mentha-8-thiol-3-one,
 d) cis-3-hexenyl isobutyrate,
 e) allyl amyl glycolate.

Compound a)

From the viewpoint of vaporization and odor reduction that the concentration of compound a) is preferably 0.001% by weight or more, more preferably 0.0025% by weight or more, still more preferably 0.005% by weight or more, still further more preferably 0.01% by weight or more, calculated to the total weight of the composition.

From the viewpoint of vaporization, economic reasons, and fragrance coordination that the concentration of compound a) is preferably 0.15% by weight or less, more preferably 0.08% by weight or less, still more preferably 0.05% by weight or less, still further more preferably 0.03% by weight or less, still further more preferably 0.02% by weight or less, still further more preferably 0.0175% by weight or less, still further more preferably 0.015% by weight or less, calculated to the total weight of the composition.

For attaining the above-mentioned effect, the concentration of compound a) is preferably in the range of 0.001% to 0.15% by weight, more preferably in the range of 0.001% to 0.08% by weight, still more preferably in the range of 0.001% to 0.05% by weight, still further more preferably in the range of 0.0025% to 0.03% by weight, still further more preferably in the range of 0.005% to 0.02% by weight, still further more preferably in the range of 0.01% to 0.0175% by weight, still further more preferably in the range of 0.01% to 0.015% by weight, calculated to the total weight of the composition.

Compound b)

From the viewpoint of vaporization and odor reduction that the concentration of compound b) is preferably 0.1% by weight or more, more preferably 0.25% by weight or more, still more preferably 0.5% by weight or more, still further more preferably 1% by weight or more, calculated to the total weight of the composition.

From the viewpoint of vaporization, economic reasons, and fragrance coordination that the concentration of compound b) is 25% by weight or less, more preferably 8% by weight or less, still more preferably 5% by weight or less, still further more preferably 3% by weight or less, still further more preferably 2.8% by weight or less, still further more preferably 2.6% by weight or less, still further more preferably 2.5% by weight or less, calculated to the total weight of the composition.

For attaining the above-mentioned effect, the concentration of compound b) is preferably in the range of 0.1% to 25% by weight, more preferably in the range of 0.1% to 8% by weight, still more preferably in the range of 0.1% to 5% by weight, still further more preferably in the range of 0.25% to 3% by weight, still further more preferably in the range of 0.5% to 2.8% by weight, still further more preferably in the range of 1% to 2.6% by weight, still further more preferably in the range of 1% to 2.5% by weight calculated to the total weight of the composition.

A weight ratio of compound a) to compound b), a/b, is preferably 0.0004 or more, more preferably 0.001 or more from the viewpoint of odor reduction, and is preferably 0.1 or less, more preferably 0.01 or less from the viewpoint of fragrance coordination.

Compound c)

From the viewpoint of vaporization and odor reduction that the concentration of compound c) is preferably 0.1% by weight or more, more preferably 0.25% by weight or more, still more preferably 0.5% by weight or more, still further more preferably 0.7% by weight or more, calculated to the total weight of the composition.

From the viewpoint of vaporization, economic reasons, and fragrance coordination that the concentration of compound c) is preferably 32% by weight, more preferably 5% by weight or less, still more preferably 3% by weight or less, still further more preferably 2% by weight or less, still further more preferably 1.5% by weight or less, calculated to the total weight of the composition.

For attaining the above-mentioned effect, the concentration of compound c) is preferably in the range of 0.1% to 32% by weight, more preferably in the range of 0.1% to 5% by weight, still more preferably in the range of 0.25% to 3% by weight, still further more preferably in the range of 0.5% to 2% by weight, still further more preferably in the range of 0.7% to 1.5% by weight, calculated to the total weight of the composition.

From the viewpoint of fragrance coordination, a weight ratio of compound c) to compound b), c/b, is preferably 0.16 or more, more preferably 0.2 or more, still more preferably 0.5 or more, still further more preferably 0.8 or more, and is preferably 5.33 or less, more preferably 5.0 or less, still more preferably 3.0 or less, still further more preferably 2.0 or less.

Compound d)

From the viewpoint of vaporization and odor reduction that the concentration of compound d) is preferably 0.01% by weight or more, preferably 0.025% by weight or more, more preferably 0.05% by weight or more, still further more preferably 0.07% by weight or more, calculated to the total weight of the composition.

From the viewpoint of vaporization and economic reasons that the concentration of compound d) is preferably 0.5% by weight or less, more preferably 0.3% by weight or less, still more preferably 0.2% by weight or less, still further more preferably 0.15% by weight or less, calculated to the total weight of the composition.

For attaining the above-mentioned effect, the concentration of compound d) is preferably in the range of 0.01% to 0.5% by weight, more preferably in the range of 0.025% to 0.3% by weight, still more preferably in the range of 0.05% to 0.2% by weight, still further more preferably in the range of 0.07% to 0.15% by weight, calculated to the total weight of the composition.

Compound e)

From the viewpoint of vaporization and odor reduction that the concentration of compound e) is preferably 0.01% by weight or more, more preferably 0.1% by weight or more, still more preferably 0.25% by weight or more, still further more preferably 0.3% by weight or more, calculated to the total weight of the composition.

From the viewpoint of vaporization, economic reasons, and fragrance coordination that the concentration of compound e) is preferably 8% by weight, more preferably 3% by weight or less, still more preferably 1.5% by weight or less, still furthermore preferably 1% by weight or less, still further more preferably 0.75% by weight or less, calculated to the total weight of the composition.

For attaining the above-mentioned effect, the concentration of compound e) is preferably in the range of 0.01% to 8% by weight, more preferably in the range of 0.01% to 3% by weight, still more preferably in the range of 0.1% to 1.5% by weight, still further more preferably in the range of 0.25% to 1% by weight, still further more preferably in the range of 0.3% to 0.75% by weight, calculated to the total weight of the composition.

A weight ratio of compound e) to compound b), 61), is preferably 0.001 or more, more preferably 0.04 or more, still more preferably 0.08 or more from the viewpoint of odor reduction, and is preferably 0.32 or less, more preferably 0.2 or less, still more preferably 0.1 or less form the viewpoint of fragrance coordination.

The total amount of compounds a), b), c), and e) is preferably 0.1% by weight or more, more preferably 0.4% by weight or more, still more preferably 1.0% by weight or more, still further more preferably 2.0% by weight or more, calculated to the total weight of the composition from the viewpoint of vaporization and odor reduction. The total amount of four compounds a), b), c), and e) is preferably 30.0% by weight or less, more preferably 10.0% by weight or less, still more preferably 9.5% by weight or less, still further more preferably 9.4% by weight or less, calculated to the total weight of the composition from the viewpoint of vaporization, economic reasons, and fragrance coordination.

Preferred fragrance compositions comprising compounds a)-e)

The following fragrance compositions comprising a combination of compound a) and two different compounds selected from the group of b)-e) are preferred from the viewpoint of vaporization and odor reduction:

A fragrance composition comprising:
compound a) at a concentration in the range of 0.001% to 0.08% by weight,
compound b) at a concentration in the range of 0.1% to 8% by weight,
compound c) at a concentration in the range of 0.1% to 5% by weight, each calculated to the total weight of the composition.

A fragrance composition comprising:
compound a) at a concentration in the range of 0.001% to 0.08% by weight,
compound b) at a concentration in the range of 0.1% to 5% by weight,
compound c) at a concentration in the range of 0.1% to 5% by weight, each calculated to the total weight of the composition.

A fragrance composition comprising:
compound a) at a concentration in the range of 0.001% to 0.08% by weight,
compound b) at a concentration in the range of 0.1% to 5% by weight,
compound c) at a concentration in the range of 0.25% to 3% by weight, each calculated to the total weight of the composition.

A fragrance composition comprising:
compound a) at a concentration in the range of 0.001% to 0.0175% by weight,
compound b) at a concentration in the range of 0.1% to 8% by weight,
compound c) at a concentration in the range of 0.1% to 5% by weight, each calculated to the total weight of the composition.

A fragrance composition comprising:
compound a) at a concentration in the range of 0.001% to 0.0175% by weight,
compound b) at a concentration in the range of 0.1% to 5% by weight,
compound c) at a concentration in the range of 0.1% to 5% by weight, each calculated to the total weight of the composition.

A fragrance composition comprising:
compound a) at a concentration in the range of 0.001% to 0.0175% by weight,
compound b) at a concentration in the range of 0.1% to 8% by weight,
compound c) at a concentration in the range of 0.25% to 3% by weight, each calculated to the total weight of the composition.

A fragrance composition comprising:
compound a) at a concentration in the range of 0.001% to 0.08% by weight,
compound b) at a concentration in the range of 0.1% to 8% by weight,
compound d) at a concentration in the range of 0.01% to 0.5% by weight, each calculated to the total weight of the composition.

A fragrance composition comprising:
compound a) at a concentration in the range of 0.001% to 0.08% by weight,
compound b) at a concentration in the range of 0.1% to 5% by weight,
compound d) at a concentration in the range of 0.01% to 0.5% by weight, each calculated to the total weight of the composition.

A fragrance composition comprising:
compound a) at a concentration in the range of 0.001% to 0.08% by weight,
compound b) at a concentration in the range of 0.1% to 5% by weight,
compound d) at a concentration in the range of 0.025% to 0.3% by weight, each calculated to the total weight of the composition.

A fragrance composition comprising:
compound a) at a concentration in the range of 0.001% to 0.0175% by weight,
compound b) at a concentration in the range of 0.1% to 8% by weight,
compound d) at a concentration in the range of 0.01% to 0.5% by weight, each calculated to the total weight of the composition.

A fragrance composition comprising:
compound a) at a concentration in the range of 0.001% to 0.0175% by weight,
compound b) at a concentration in the range of 0.1% to 5% by weight,
compound d) at a concentration in the range of 0.01% to 0.5% by weight, each calculated to the total weight of the composition.

A fragrance composition comprising:
compound a) at a concentration in the range of 0.001% to 0.0175% by weight,
compound b) at a concentration in the range of 0.1% to 5% by weight,
compound d) at a concentration in the range of 0.025% to 0.3% by weight, each calculated to the total weight of the composition.

A fragrance composition comprising:
compound a) at a concentration in the range of 0.001% to 0.08% by weight,
compound b) at a concentration in the range of 0.1% to 8% by weight,
compound e) at a concentration in the range of 0.01% to 3% by weight, each calculated to the total weight of the composition.

A fragrance composition comprising:
compound a) at a concentration in the range of 0.001% to 0.08% by weight,
compound b) at a concentration in the range of 0.1% to 5% by weight,
compound e) at a concentration in the range of 0.01% to 3% by weight, each calculated to the total weight of the composition.

A fragrance composition comprising:
compound a) at a concentration in the range of 0.001% to 0.08% by weight,
compound b) at a concentration in the range of 0.1% to 5% by weight,
compound e) at a concentration in the range of 0.1% to 1.5% by weight, each calculated to the total weight of the composition.

A fragrance composition comprising:
compound a) at a concentration in the range of 0.001% to 0.0175% by weight,
compound b) at a concentration in the range of 0.1% to 8% by weight,
compound e) at a concentration in the range of 0.01% to 3% by weight, each calculated to the total weight of the composition.

A fragrance composition comprising:
compound a) at a concentration in the range of 0.001% to 0.0175% by weight,
compound b) at a concentration in the range of 0.1% to 5% by weight, compound e) at a concentration in the range of 0.01% to 3% by weight, each calculated to the total weight of the composition.

A fragrance composition comprising:
compound a) at a concentration in the range of 0.001% to 0.0175% by weight,
compound b) at a concentration in the range of 0.1% to 5% by weight,
compound e) at a concentration in the range of 0.1% to 1.5% by weight, each calculated to the total weight of the composition.

A fragrance composition comprising:
compound a) at a concentration in the range of 0.001% to 0.08% by weight,
compound c) at a concentration in the range of 0.1% to 5% by weight,
compound d) at a concentration in the range of 0.01% to 0.5% by weight, each calculated to the total weight of the composition.

A fragrance composition comprising:
compound a) at a concentration in the range of 0.001% to 0.08% by weight,
compound c) at a concentration in the range of 0.1% to 5% by weight,
compound d) at a concentration in the range of 0.025% to 0.3% by weight, each calculated to the total weight of the composition.

A fragrance composition comprising:
compound a) at a concentration in the range of 0.001% to 0.08% by weight,
compound c) at a concentration in the range of 0.25% to 3% by weight,
compound d) at a concentration in the range of 0.025% to 0.3% by weight, each calculated to the total weight of the composition.

A fragrance composition comprising:
compound a) at a concentration in the range of 0.001% to 0.0175% by weight,
compound c) at a concentration in the range of 0.1% to 5% by weight,
compound d) at a concentration in the range of 0.01% to 0.5% by weight, each calculated to the total weight of the composition.

A fragrance composition comprising:
compound a) at a concentration in the range of 0.001% to 0.0175% by weight,
compound c) at a concentration in the range of 0.1% to 5% by weight,
compound d) at a concentration in the range of 0.025% to 0.3% by weight, each calculated to the total weight of the composition.

A fragrance composition comprising:
compound a) at a concentration in the range of 0.001% to 0.0175% by weight,
compound c) at a concentration in the range of 0.25% to 3% by weight,
compound d) at a concentration in the range of 0.025% to 0.3% by weight, each calculated to the total weight of the composition.

A fragrance composition comprising:
compound a) at a concentration in the range of 0.001% to 0.08% by weight,
compound d) at a concentration in the range of 0.1% to 0.5% by weight,
compound e) at a concentration in the range of 0.01% to 3% by weight, each calculated to the total weight of the composition.

A fragrance composition comprising:
compound a) at a concentration in the range of 0.001% to 0.08% by weight,
compound d) at a concentration in the range of 0.01% to 0.5% by weight,
compound e) at a concentration in the range of 0.1% to 1.5% by weight, each calculated to the total weight of the composition.

A fragrance composition comprising:
compound a) at a concentration in the range of 0.001% to 0.08% by weight,
compound d) at a concentration in the range of 0.025% to 0.3% by weight,
compound e) at a concentration in the range of 0.1% to 1.5% by weight, each calculated to the total weight of the composition.

A fragrance composition comprising:
compound a) at a concentration in the range of 0.001% to 0.0175% by weight,
compound d) at a concentration in the range of 0.01% to 0.5% by weight,
compound e) at a concentration in the range of 0.01% to 3% by weight, each calculated to the total weight of the composition.

A fragrance composition comprising:
compound a) at a concentration in the range of 0.001% to 0.0175% by weight,
compound d) at a concentration in the range of 0.01% to 0.5% by weight,
compound e) at a concentration in the range of 0.1% to 1.5% by weight, each calculated to the total weight of the composition.

A fragrance composition comprising:
compound a) at a concentration in the range of 0.001% to 0.0175% by weight,
compound d) at a concentration in the range of 0.025% to 0.3% by weight,
compound e) at a concentration in the range of 0.1% to 1.5% by weight, each calculated to the total weight of the composition.

A fragrance composition comprising:
compound a) at a concentration in the range of 0.001% to 0.08% by weight,
compound c) at a concentration in the range of 0.1% to 5% by weight,
compound e) at a concentration in the range of 0.01% to 3% by weight, each calculated to the total weight of the composition.

A fragrance composition comprising:
compound a) at a concentration in the range of 0.001% to 0.08% by weight,
compound c) at a concentration in the range of 0.1% to 5% by weight,
compound e) at a concentration in the range of 0.1% to 1.5% by weight, each calculated to the total weight of the composition.

A fragrance composition comprising:
compound a) at a concentration in the range of 0.001% to 0.08% by weight,
compound c) at a concentration in the range of 0.25% to 3% by weight,
compound e) at a concentration in the range of 0.1% to 1.5% by weight, each calculated to the total weight of the composition.

A fragrance composition comprising:
compound a) at a concentration in the range of 0.001% to 0.0175% by weight, compound c) at a concentration in the range of 0.1% to 5% by weight, compound e) at a concentration in the range of 0.01% to 3% by weight, each calculated to the total weight of the composition.

A fragrance composition comprising:

compound a) at a concentration in the range of 0.001% to 0.0175% by weight, compound c) at a concentration in the range of 0.1% to 5% by weight, compound e) at a concentration in the range of 0.1% to 1.5% by weight, each calculated to the total weight of the composition.

A fragrance composition comprising:

compound a) at a concentration in the range of 0.001% to 0.0175% by weight, compound c) at a concentration in the range of 0.25% to 3% by weight, compound e) at a concentration in the range of 0.1% to 1.5% by weight, each calculated to the total weight of the composition.

The following fragrance compositions comprising a combination of compound a) and three different compounds selected from the group of b)-e) are preferred from the viewpoint of vaporization and odor reduction:

A fragrance composition comprising:

compound a) at a concentration in the range of 0.01% to 0.0175% by weight, compound b) at a concentration in the range of 1% to 2.6% by weight, compound c) at a concentration in the range of 0.7% to 1.5% by weight, compound e) at a concentration in the range of 0.3% to 0.75% by weight, each calculated to the total weight of the composition.

A fragrance composition comprising:

compound a) at a concentration in the range of 0.01% to 0.0175% by weight, compound b) at a concentration in the range of 1% to 2.6% by weight, compound c) at a concentration in the range of 0.7% to 1.5% by weight, compound e) at a concentration in the range of 0.25% to 1% by weight, each calculated to the total weight of the composition.

A fragrance composition comprising:

compound a) at a concentration in the range of 0.005% to 0.02% by weight, compound b) at a concentration in the range of 1% to 2.6% by weight, compound c) at a concentration in the range of 0.7% to 1.5% by weight, compound e) at a concentration in the range of 0.3% to 0.75% by weight, each calculated to the total weight of the composition.

A fragrance composition comprising:

compound a) at a concentration in the range of 0.01% to 0.0175% by weight, compound b) at a concentration in the range of 1% to 2.6% by weight, compound c) at a concentration in the range of 0.5% to 2% by weight, compound e) at a concentration in the range of 0.3% to 0.75% by weight, each calculated to the total weight of the composition.

A fragrance composition comprising:

compound a) at a concentration in the range of 0.01% to 0.0175% by weight, compound b) at a concentration in the range of 0.5% to 2.8% by weight, compound c) at a concentration in the range of 0.7% to 1.5% by weight, compound e) at a concentration in the range of 0.3% to 0.75% by weight, each calculated to the total weight of the composition.

A fragrance composition comprising:

compound a) at a concentration in the range of 0.005% to 0.02% by weight, compound b) at a concentration in the range of 0.5% to 2.8% by weight, compound c) at a concentration in the range of 0.5% to 2% by weight, compound e) at a concentration in the range of 0.25% to 1% by weight, each calculated to the total weight of the composition.

A fragrance composition comprising:

compound a) at a concentration in the range of 0.01% to 0.08% by weight, compound b) at a concentration in the range of 1% to 2.6% by weight, compound c) at a concentration in the range of 0.7% to 1.5% by weight, compound e) at a concentration in the range of 0.01% to 3% by weight, each calculated to the total weight of the composition.

A fragrance composition comprising:

compound a) at a concentration in the range of 0.01% to 0.08% by weight, compound b) at a concentration in the range of 1% to 2.6% by weight, compound c) at a concentration in the range of 0.7% to 1.5% by weight, compound e) at a concentration in the range of 0.3% to 0.75% by weight, each calculated to the total weight of the composition.

A fragrance composition comprising:

compound a) at a concentration in the range of 0.01% to 0.05% by weight, compound b) at a concentration in the range of 1% to 2.6% by weight, compound c) at a concentration in the range of 0.7% to 1.5% by weight, compound e) at a concentration in the range of 0.3% to 0.75% by weight, each calculated to the total weight of the composition.

A fragrance composition comprising:

compound a) at a concentration in the range of 0.01% to 0.05% by weight, compound b) at a concentration in the range of 1% to 2.6% by weight, compound c) at a concentration in the range of 0.5% to 2% by weight, compound e) at a concentration in the range of 0.1% to 1.5% by weight, each calculated to the total weight of the composition.

A fragrance composition comprising:

compound a) at a concentration in the range of 0.025% to 0.03% by weight, compound b) at a concentration in the range of 0.5% to 2.8% by weight, compound c) at a concentration in the range of 0.7% to 1.5% by weight, compound e) at a concentration in the range of 0.25% to 1% by weight, each calculated to the total weight of the composition.

A fragrance composition comprising:
compound a) at a concentration in the range of 0.025% to 0.03% by weight,
compound b) at a concentration in the range of 0.5% to 2.8% by weight,
compound c) at a concentration in the range of 0.5% to 2% by weight,
compound e) at a concentration in the range of 0.3% to 0.75% by weight, each calculated to the total weight of the composition.

A fragrance composition comprising:
compound a) at a concentration in the range of 0.001% to 0.0175% by weight,
compound b) at a concentration in the range of 1% to 2.6% by weight,
compound d) at a concentration in the range of 0.07% to 0.15% by weight,
compound e) at a concentration in the range of 0.3% to 0.75% by weight, each calculated to the total weight of the composition.

A fragrance composition comprising:
compound a) at a concentration in the range of 0.001% to 0.0175% by weight,
compound b) at a concentration in the range of 1% to 2.6% by weight,
compound d) at a concentration in the range of 0.05% to 0.2% by weight,
compound e) at a concentration in the range of 0.3% to 0.75% by weight, each calculated to the total weight of the composition.

A fragrance composition comprising:
compound a) at a concentration in the range of 0.005% to 0.02% by weight,
compound b) at a concentration in the range of 1% to 2.6% by weight,
compound d) at a concentration in the range of 0.07% to 0.15% by weight,
compound e) at a concentration in the range of 0.3% to 0.75% by weight, each calculated to the total weight of the composition.

A fragrance composition comprising:
compound a) at a concentration in the range of 0.001% to 0.0175% by weight,
compound b) at a concentration in the range of 1% to 2.6% by weight,
compound d) at a concentration in the range of 0.07% to 0.15% by weight,
compound e) at a concentration in the range of 0.25% to 1% by weight, each calculated to the total weight of the composition.

A fragrance composition comprising:
compound a) at a concentration in the range of 0.001% to 0.0175% by weight,
compound b) at a concentration in the range of 0.5% to 2.8% by weight,
compound d) at a concentration in the range of 0.07% to 0.15% by weight,
compound e) at a concentration in the range of 0.3% to 0.75% by weight, each calculated to the total weight of the composition.

A fragrance composition comprising:
compound a) at a concentration in the range of 0.005% to 0.02% by weight,
compound b) at a concentration in the range of 0.5% to 2.8% by weight,
compound d) at a concentration in the range of 0.05% to 0.2% by weight,
compound e) at a concentration in the range of 0.25% to 1% by weight, each calculated to the total weight of the composition.

A fragrance composition comprising:
compound a) at a concentration in the range of 0.001% to 0.08% by weight,
compound b) at a concentration in the range of 1% to 2.6% by weight,
compound d) at a concentration in the range of 0.01% to 0.5% by weight,
compound e) at a concentration in the range of 0.01% to 3% by weight, each calculated to the total weight of the composition.

A fragrance composition comprising:
compound a) at a concentration in the range of 0.001% to 0.08% by weight,
compound b) at a concentration in the range of 1% to 2.6% by weight,
compound d) at a concentration in the range of 0.07% to 0.15% by weight,
compound e) at a concentration in the range of 0.01% to 3% by weight, each calculated to the total weight of the composition.

A fragrance composition comprising:
compound a) at a concentration in the range of 0.001% to 0.05% by weight,
compound b) at a concentration in the range of 1% to 2.6% by weight,
compound d) at a concentration in the range of 0.07% to 0.15% by weight,
compound e) at a concentration in the range of 0.01% to 3% by weight, each calculated to the total weight of the composition.

A fragrance composition comprising:
compound a) at a concentration in the range of 0.001% to 0.05% by weight,
compound b) at a concentration in the range of 1% to 2.6% by weight,
compound d) at a concentration in the range of 0.025% to 0.3% by weight,
compound e) at a concentration in the range of 0.25% to 1% by weight, each calculated to the total weight of the composition.

A fragrance composition comprising:
compound a) at a concentration in the range of 0.0025% to 0.03% by weight,
compound b) at a concentration in the range of 0.5% to 2.8% by weight,
compound d) at a concentration in the range of 0.05% to 0.2% by weight,
compound e) at a concentration in the range of 0.3% to 0.75% by weight, each calculated to the total weight of the composition.

A fragrance composition comprising:
compound a) at a concentration in the range of 0.0025% to 0.03% by weight,
compound b) at a concentration in the range of 0.5% to 2.8% by weight,
compound d) at a concentration in the range of 0.07% to 0.15% by weight,
compound e) at a concentration in the range of 0.25% to 1% by weight, each calculated to the total weight of the composition.

The following fragrance compositions comprising a combination of compound a)-e) are preferred from the viewpoint of vaporization and odor reduction:

A fragrance composition comprising:
compound a) at a concentration in the range of 0.001% to 0.0175% by weight,
compound b) at a concentration in the range of 1% to 2.6% by weight,
compound c) at a concentration in the range of 0.7% to 1.5% by weight,
compound d) at a concentration in the range of 0.01% to 0.5% by weight,
compound e) at a concentration in the range of 0.01% to 3% by weight, each calculated to the total weight of the composition.

A fragrance composition comprising:
compound a) at a concentration in the range of 0.001% to 0.0175% by weight,
compound b) at a concentration in the range of 1% to 2.6% by weight,
compound c) at a concentration in the range of 0.7% to 1.5% by weight,
compound d) at a concentration in the range of 0.01% to 0.5% by weight,
compound e) at a concentration in the range of 0.25% to 1% by weight, each calculated to the total weight of the composition.

A fragrance composition comprising:
compound a) at a concentration in the range of 0.005% to 0.02% by weight,
compound b) at a concentration in the range of 1% to 2.6% by weight,
compound c) at a concentration in the range of 0.7% to 1.5% by weight,
compound d) at a concentration in the range of 0.025% to 0.3% by weight,
compound e) at a concentration in the range of 0.3% to 0.75% by weight, each calculated to the total weight of the composition.

A fragrance composition comprising:
compound a) at a concentration in the range of 0.001% to 0.0175% by weight,
compound b) at a concentration in the range of 1% to 2.6% by weight,
compound c) at a concentration in the range of 0.5% to 2% by weight,
compound d) at a concentration in the range of 0.025% to 0.3% by weight,
compound e) at a concentration in the range of 0.3% to 0.75% by weight, each calculated to the total weight of the composition.

A fragrance composition comprising:
compound a) at a concentration in the range of 0.001% to 0.0175% by weight,
compound b) at a concentration in the range of 0.5% to 2.8% by weight,
compound c) at a concentration in the range of 0.7% to 1.5% by weight,
compound d) at a concentration in the range of 0.05% to 0.2% by weight,
compound e) at a concentration in the range of 0.3% to 0.75% by weight, each calculated to the total weight of the composition.

A fragrance composition comprising:
compound a) at a concentration in the range of 0.005% to 0.02% by weight,
compound b) at a concentration in the range of 0.5% to 2.8% by weight,
compound c) at a concentration in the range of 0.5% to 2% by weight,
compound d) at a concentration in the range of 0.05% to 0.2% by weight,
compound e) at a concentration in the range of 0.25% to 1% by weight, each calculated to the total weight of the composition.

A fragrance composition comprising:
compound a) at a concentration in the range of 0.001% to 0.08% by weight,
compound b) at a concentration in the range of 1% to 2.6% by weight,
compound c) at a concentration in the range of 0.7% to 1.5% by weight,
compound d) at a concentration in the range of 0.01% to 0.5% by weight,
compound e) at a concentration in the range of 0.01% to 3% by weight, each calculated to the total weight of the composition.

A fragrance composition comprising:
compound a) at a concentration in the range of 0.001% to 0.08% by weight,
compound b) at a concentration in the range of 1% to 2.6% by weight,
compound c) at a concentration in the range of 0.7% to 1.5% by weight,
compound d) at a concentration in the range of 0.07% to 0.15% by weight,
compound e) at a concentration in the range of 0.3% to 0.75% by weight, each calculated to the total weight of the composition.

A fragrance composition comprising:
compound a) at a concentration in the range of 0.001% to 0.05% by weight,
compound b) at a concentration in the range of 1% to 2.6% by weight,
compound c) at a concentration in the range of 0.7% to 1.5% by weight,
compound d) at a concentration in the range of 0.01% to 0.5% by weight,
compound e) at a concentration in the range of 0.3% to 0.75% by weight, each calculated to the total weight of the composition.

A fragrance composition comprising:
compound a) at a concentration in the range of 0.001% to 0.05% by weight,
compound b) at a concentration in the range of 1% to 2.6% by weight,
compound c) at a concentration in the range of 0.5% to 2% by weight,
compound d) at a concentration in the range of 0.07% to 0.15% by weight,
compound e) at a concentration in the range of 0.1% to 1.5% by weight, each calculated to the total weight of the composition.

A fragrance composition comprising:
compound a) at a concentration in the range of 0.0025% to 0.03% by weight,
compound b) at a concentration in the range of 0.5% to 2.8% by weight,
compound c) at a concentration in the range of 0.7% to 1.5% by weight,
compound d) at a concentration in the range of 0.01% to 0.5% by weight, compound e) at a concentration in the range of 0.25% to 1% by weight, each calculated to the total weight of the composition.

A fragrance composition comprising:
compound a) at a concentration in the range of 0.0025% to 0.03% by weight,
compound b) at a concentration in the range of 0.5% to 2.8% by weight,
compound c) at a concentration in the range of 0.5% to 2% by weight,
compound d) at a concentration in the range of 0.07% to 0.15% by weight,
compound e) at a concentration in the range of 0.3% to 0.75% by weight, each calculated to the total weight of the composition.

Organic Solvents

It is preferred from the viewpoint of vaporization that the composition of the present invention comprises one or more organic solvent(s). It is further preferred from the viewpoint of vaporization and cosmetic safety that one or more organic solvent(s) is selected from benzyl alcohol, dipropylene glycol, isopropyl myristate, and ethanol. Mixtures of the aforementioned solvents are preferred as well.

From the viewpoint of vaporization, cosmetic safety, and fragrance coordination that the total concentration of organic solvents, preferably one or more selected from benzyl alcohol, dipropylene glycol, isopropyl myristate and ethanol, is preferably 1% by weight or more, more preferably 5% by weight or more, still more preferably 6% by weight or more, still further more preferably 10% by weight or more, still further more preferably 20% by weight or more, sill further more preferably 30% by weight or more, still further more preferably 40% by weight or more, calculated to the total weight of the composition.

From the viewpoint of vaporization, cosmetic safety, and masking property that the total concentration of organic solvents, preferably one or more selected from benzyl alcohol, dipropylene glycol, isopropyl myristate, and ethanol, is preferably 99% by weight or less, more preferably 90% by weight or less, still more preferably 85% by weight or less, still further more preferably 80% by weight or less, still further preferably 60% by weight or less, and still further more preferably 50% by weight or less, calculated to the total weight of the composition.

For attaining the above-mentioned effects, the total concentration of organic solvents, preferably one or more selected from benzyl alcohol, dipropylene glycol, isopropyl myristate, and ethanol, is preferably in the range of 1% to 99% by weight, more preferably in the range of 5% to 90% by weight, still more preferably in the range of 6% to 85% by weigh, still further more preferably in the range of 10% to 80% by weight, still further more preferably in the range of 20% to 80% by weight, still further more preferably in the range of 30% to 80% by weight, still further more preferably in the range of 40% to 80% by weigh, calculated to the total weight of the composition.

The following fragrance compositions comprising compounds a), b), c), e) and one or more organic solvent(s) are preferred from the viewpoint of vaporization and odor reduction:

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
organic solvent(s), preferably one or more selected from benzyl alcohol, dipropylene glycol, isopropyl myristate, and ethanol, at a total concentration in the range of 10% to 30% by weight, each calculated to the total weight of the composition.

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
organic solvent(s), preferably one or more selected from benzyl alcohol, dipropylene glycol, isopropyl myristate, and ethanol, at a total concentration in the range of 60% to 90% by weight, each calculated to the total weight of the composition.

The composition of the present invention may comprise water. From the viewpoint of keeping the fragrance composition homogenous without being separated and easily controlling the volatilization amount and the quality of a scent (fragrance), the water content is preferably 10% by weight or less, more preferably 5% by weight or less, still more preferably 3% by weight or less.

Terpenes

It is preferred from the viewpoint of modifying the aesthetics of a scent, especially providing a fresh scent that the composition of the present invention comprises terpenes. Terpenes are compounds typically found in plant essential oils. Preferred terpenes include, but are not limited to: limonene, D-limonene, myrcene, camphene, terpinene, α-pinene, β-pinene, sabinene, ocimene, p-cymene, and α-phellandrene. Preferred terpene is limonene. More preferred terpene is D-limonene.

Terpenes may be used in the form of essential oil terpenes.

Essential oil terpenes are mainly mixtures of terpenes obtained by extraction from parts of plants such as leaves, pericarps and branches. Preferred essential oil terpenes are citrus oil terpenes. The citrus oil terpenes include, but are not limited to: orange oil terpenes, lemon oil terpenes, mandarin oil terpenes, bergamot oil terpenes, and lime oil terpenes. More preferred citrus oil terpenes are one or more selected from the group of including lemon oil terpenes, and orange oil terpenes. Particularly preferred essential oil terpenes is lemon oil terpenes. Major terpene included the above mentioned citrus oil terpenes is limonene. Limonene is typically contained in more than 60% of the above mentioned citrus oil terpenes.

It is preferred from the viewpoint of providing a fresh scent that the total concentration of limonene is 0.1% by weight or more, preferably 0.5% by weight or more, more preferably 1% by weight or more, still further more preferably 3% by weight or more, calculated to the total weight of the composition.

It is preferred from the viewpoint of providing a fresh scent that the total concentration of limonene is 40% by weight or less, preferably 20% by weight or less, more preferably 12% by weight or less, calculated to the total weight of the composition.

For attaining the above-mentioned effect, it is preferred that the total concentration of limonene is in the range of 0.1% to 40% by weight, preferably in the range of 0.5% to 20% by weight, more preferably in the range of 1% to 12% by weight, still further more preferably 3% to 12% by weight, calculated to the total weight of the composition.

The following fragrance compositions comprising compounds a), b), c), e) and limonene are preferred from the viewpoint of vaporization, odor reduction, and fresh scent:

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 1% to 40% by weight, each calculated to the total weight of the composition.

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 3% to 20% by weight, each calculated to the total weight of the composition.

The following fragrance compositions comprising compounds a), b), c), e) and limonene, and organic solvents are preferred from the viewpoint of vaporization, odor reduction, and fresh scent:

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 1% to 10% by weight,
organic solvent(s), preferably one or more selected from benzyl alcohol, dipropylene glycol, isopropyl myristate and ethanol, at a total concentration in the range of 10% to 30% by weight, each calculated to the total weight of the composition.

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 1% to 20% by weight,
organic solvent(s), preferably one or more selected from benzyl alcohol, dipropylene glycol, isopropyl myristate, and ethanol, at a total concentration in the range of 60% to 90% by weight, each calculated to the total weight of the composition.

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 3% to 20% by weight,
organic solvent(s), preferably one or more selected from benzyl alcohol, dipropylene glycol, isopropyl myristate, and ethanol, at a total concentration in the range of 10% to 30% by weight, each calculated to the total weight of the composition.

A fragrance composition comprising:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 3% to 15% by weight,
organic solvent(s), preferably one or more selected from benzyl alcohol, dipropylene glycol, isopropyl myristate, and ethanol, at a total concentration in the range of 60% to 90% by weight, each calculated to the total weight of the composition.

Absorbent Solid Substrate

The present invention is also directed to an absorbent solid substrate being impregnated with or entrapping any of the fragrance compositions as defined above.

The purpose of the absorbent solid substrate is to absorb or enclose the fragrance composition and to release the composition over an extended period of time.

Suitably, the absorbent solid substrates may be a sheet, a particle or plurality of particles, preferably a plurality of resin particles, or a sponge.

During preparing or manufacturing of the absorbent solid substrate, the absorbent solid substrate is impregnated with any of the fragrance compositions as defined above. Suitable impregnation methods are, for example, spraying the fragrance composition onto the substrate and letting it absorb, or immersing the solid substrate with the fragrance composition for a certain period of time and letting the fragrance composition absorb.

Suitably, the absorbent solid substrate comprises natural and/or synthetic polymers fibers. From the viewpoint of biodegradability it is preferred that natural polymer fibers are selected from cellulose, starch, and/or alginate, and from the viewpoint of chemical stability it is preferred synthetic polymer fibers are selected from fibers comprising optionally alkylated acrylate, optionally alkylated methacrylate, or vinylpyrrolidone fibers.

From the viewpoint of further conferring chemical and/or mechanical stability of the absorbent solid substrate, it is preferred that the natural polymer fibers are selected from crosslinked cellulose, crosslinked starch, and/or crosslinked alginate, and/or synthetic polymer fibers are selected from fibers comprising optionally alkylated crosslinked acrylate, optionally alkylated crosslinked methacrylate, or crosslinked vinylpyrrolidone fibers.

In one aspect of the present invention, the absorbent solid substrate is a gel, preferably a hydrogel, entrapping the fragrance composition as defined above. Gels may be produced by mixing solvent with a gelling compound. In the case of hydrogels, the solvent is water or a mixture of organic solvents with water. The gelling compound may be any suitable polymer forming a gel with a solvent. Another option is the in-situ formation of the gel by mixing monomers and polymerization initiators, for example mixing acrylate compounds with persulfate radical initiators. During or after formation of the gel, the fragrance composition is added to the gel, for example by impregnating as described above.

From the viewpoint of ensuring a sufficient amount of fragrance to be released over time, the absorbent solid substrate is configured to absorb at least 10% by weight of the fragrance composition, calculated to the total weight of the absorbent solid substrate.

For ensuring proper release of the impregnated fragrance composition, the artisan will select proper porosities of the absorbent solid substrate.

Fragrance Container

The present invention is also directed to a fragrance container for a scent dispenser, preferably for a vaporizer, comprising:
  a container body configured to store fragrance compositions,
  one or more outlet(s) for liquid and/or gas,
  optionally a container seal for sealing the one or more outlet(s) of the container,
  the fragrance composition as defined above.

In one aspect of the present invention, the container body is configured to store liquid fragrance compositions. In this case, the container comprises the fragrance composition as defined above in liquid form, either diluted or undiluted. If a dilution of the fragrance composition is desired, the composition is diluted with one or more organic solvent(s), preferably one or more selected from benzyl alcohol, dipropylene glycol, isopropyl myristate and ethanol, with a weight ratio of fragrance composition to organic solvent in the range of 1:1 to 1:100.

With this respect, the present invention is also directed to a fragrance container for a scent dispenser, preferably for a vaporizer, comprising:
  a container body configured to store fragrance compositions,
  one or more outlet(s) for liquid and/or gas,
  optionally a container seal for sealing the one or more outlet(s) of the container,
  the fragrance composition as defined above being diluted with one or more organic solvent(s), preferably one or more selected from benzyl alcohol, dipropylene glycol, isopropyl myristate and ethanol, with a weight ratio of fragrance composition to organic solvent in the range of 1:1 to 1:100, preferably in the range of 1:2 to 1:50, more preferably in the range of 1:2 to 1:10. Then the container comprises the ready-to-use fragrance composition.

In another aspect of the present invention, the container body is configured to store absorbent solid substrates being impregnated with or entrapping the fragrance composition as defined above. For example, the container body may comprise a plurality of particles being impregnated with the fragrance composition as defined above. In another example, the container body may comprise a gel that entraps the fragrance composition.

In principle, the container body may be made of any suitable material that preferably seals the fragrance composition in an airtight manner. Suitable materials are plastics, metals, or natural polymer. It is preferred from the viewpoint of user convenience and environmental considerations that the container body is made of plastics or natural polymer housings. Suitable plastic materials include, but are not limited to, polyethylene and/or polypropylene based plastics. Suitable natural polymer body are, for example, capsules made of gelatin or starch.

In case of plastic body, it is preferred to the seal the container which serves the purpose to allow industrial filling of the container with the fragrance composition, and then to close the container while preventing evaporation and gas exchange to preserve storage stability. The seal may then be broken once by the user directly prior to the use of the container in a suitable scent dispenser. It is therefore preferable that the seal is made of plastics which can be broken by the user without enormous amount of force.

Scent Dispenser

The present invention is also directed to a scent dispenser for dispensing fragrance into the air of closed rooms comprising the composition as defined above. A 'closed room' within the meaning of the present invention is an indoor place which may have windows and doors allowing for a certain degree of air exchange with the environment, but which are kept closed the majority of the day. A closed room may, for example, be a professional hair salon or a factory treating keratin fibers with various kinds of chemical processes.

In one aspect of the present invention, the scent dispenser is a vaporizer, for example an aerosol vaporizer or a pump vaporizer. Aerosol vaporizers within the meaning of the present invention are vaporizers making use of propellants which are provided in an aerosol container in combination with the fragrance composition of the present invention. As the aerosol container is pressurized by the propellant, vaporization is conducted by actuation of the valve of the container on demand of the user while the pressurized propellant expands in volume and disperses the liquid throughout the nozzle of the actuator.

As alternative, the composition may be provided in a pump vaporizer wherein non-pressurized and/or pressurized air is the propellant and vaporization occurs at the liquid outlet of the actuator while dispersing the liquid stream with air on demand of the user pressing the actuator.

Although in principle possible for the purpose of the present invention, the disadvantage of the two vaporizers above is that they require continued or repeated user operation.

From the viewpoint of user convenience, it is preferred that the scent dispenser is an electric scent dispenser having:
  one or more electrical power connection(s) and/or one or more electrical power source(s) for providing electrical power to the dispensing means,
  a body having one or more dispensing means for continuously or sequentially dispensing fragrance compositions,
  a refillable and/or exchangeable container comprising the composition as defined above.

The preferred dispensing means for continuously or sequentially dispensing fragrance compositions is an electrical fan within the body configured to allow for an airstream over the refillable and/or exchangeable container comprising the composition as defined above. The airstream then carries the fragrance composition into the air of closed rooms.

From the viewpoint of user convenience and environmental considerations, it is preferred that the scent dispenser is an electric vaporizer having:

one or more electrical power connection(s) and/or one or more electrical power source(s) for providing electrical power to the vaporizing means,
a body having one or more vaporizing means for continuously or sequentially vaporizing fragrance compositions,
a refillable and/or exchangeable container comprising the composition as defined above.

The electric vaporizer may directly use electrical power from the power grid or electrical power stored in batteries, preferably in rechargeable batteries.

Suitable vaporizing means are venturi nozzles ultrasonic vibrators, jet vaporizers, or vibrating mesh vaporizers. Ultrasonic vibrators have an electronic oscillator allowing a piezoelectric element to vibrate at high frequency. Once the liquid fragrance composition meets the piezoelectric element, an aerosol is produced. Jet vaporizers require an additional compressor for compressing gas, preferably air, for guiding the compressed gas either through the liquid itself or through a nozzle where the liquid stream and the compressed air-stream unify allowing the production of aerosol. Vibrating mesh vaporizers possess a membrane with a plurality of holes resulting in a mesh architecture. Aerosol is produced by vibrating the mesh, for example at ultrasonic frequencies, while the liquid is in contact to the mesh. The preferred vaporizing means from the viewpoint of noise generation and minimal physical dimension are the ultrasonic vibrator and vibrating mesh vaporizer, whereas the preferred vaporizing means from the viewpoint of cost is the jet vaporizer.

From the viewpoint of user convenience, it is further preferred that the electric vaporizer has a control unit to control the vaporization rate depending on the needs of the user. The control unit may be any device being capable of receiving and/or transmitting digital or analog electronic signals. Suitable control units are, for example, microprocessors, microcontrollers, a digital integrated circuit, or an analog circuit. The control unit preferably controls the vaporization rate by modulating the vaporizing means, preferably the ultrasonic vibrator. Additionally, the control unit may be able to receive and process electronic signals from one or more sensors for measuring the aerosol flow from the vaporizing means. In response to the electronic signals of the sensor, the control unit then adjusts the vaporization rate of the vaporizing means.

It is to be noted that the vaporizing means preferably is configured to produce aerosols with particle diameters of more than 10 μm to avoid deep lung penetration. It is therefore further preferable to receive aerosol particles with diameters of more than 15 μm, still more preferably of more than 20 μm in diameter. Particle sizes of aerosols may be determined for this purpose by static laser light scattering equipment, as commonly used in this field.

The vaporizing means is configured for continuously or sequentially vaporizing the composition of the present invention. 'Continuous' vaporization within the meaning of the present invention is that vaporization extends at least over the process time of the chemical treatment services for keratin fibers, preferably over the whole 8-12 h opening hours of professional hair salons. 'Sequential' vaporization within the meaning of the present invention is that vaporization pulses of certain duration, for example 10 s to 10 min, are emitted by the vaporizer with no or low vaporization rates in between the vaporization pulses. It is to be noted that this sequential vaporization protocol may then extend over the over the process time of the chemical treatment services for keratin fibers, preferably over the whole 8-12 h opening hours of professional hair salons.

Method for Reducing Malodor

The present invention is also directed to a method for reducing malodor during chemical treatments of keratin fibers, preferably human keratin fibers, more preferably human hair, in closed rooms comprising the steps of:
i) vaporizing the composition as defined above into the air of the closed room,
ii) treating keratin fibers with one or more permanent and/or semi-permanent chemical treatment(s) in the same closed room,
with the provision that step i) may be performed prior to and/or during step ii).

In step i), amount of fragrance compounds vaporized per hour with respect to the size of space (m$^2$) represented by the following formula 1 is preferably 0.01 to 5 mg·hr$^{-1}$·m$^{-2}$, more preferably 0.05 to 3 mg·hr$^{-1}$·m$^{-2}$, still more preferably 0.1 to 2 mg·hr$^{-1}$·m$^{-2}$.

(Amount of fragrance compounds vaporized per hour with respect to size of space [mg·hr$^{-1}$·m$^{-2}$])=(total weight ratio of the fragrance compounds a), b), c), and e) in the fragrance composition to be vaporized)·(vaporization rate of the fragrance composition [mg·hr$^{-1}$]/(size of space [m$^2$]) (Formula 1)

In formula 1 above, the "total weight ratio of fragrance compounds a), b), c) and e) in fragrance composition to be vaporized" is preferably 0.1% to 30% by weight, more preferably 0.4% to 10% by weight, still more preferably 1.0% to 9.5% by weight:

Preferred chemical treatment methods whose malodor is reduced by the fragrance composition of the present invention include permanent and/or semi-permanent chemical treatment(s) selected from:
permanent shaping treatments for keratin fibers having a step of applying a composition comprising one or more sulfur-based reducing agent(s) and optionally ammonia and/or ammonium salt(s),
permanent and/or semi-permanent oxidative dyeing and/or bleaching treatments for keratin fibers having a step of applying a composition comprising ammonia and/or ammonium salt(s),
semi-permanent keratin fiber straightening treatment(s) comprising a step of applying an acidic composition comprising glyoxylic acid followed by a heating step of keratin fibers at a temperature range from 50° C. to 230° C.

It is preferred from the viewpoint of malodor reduction that step i) commences at least 10 min prior to commencing with step ii) and the composition is continuously vaporized during the treatment processes of step ii).

Permanent Shaping Treatments with Reducing Step

The term "permanent shaping" is to be understood as referring to permanent curling and permanent straightening.

Typically, permanent shaping methods for keratin fibers, preferably human keratin fibers, more preferably human hair, comprise the steps of:
x) optionally shampooing the keratin fibers,
xi) putting hair under mechanical tension,
xii) applying to keratin fibers an aqueous composition having a pH in the range of 3 to 12 comprising one or more sulphur-based reducing agent(s) and one or more alkalizing agent(s), and leaving the composition for a time period in the range of 1 min to 60 min,
xiii) optionally rinsing off the composition, xiv) providing a composition comprising one or more oxidizing agent(s), applying it to keratin fibers and leaving it for a time period in the range of 1 min to 30 min, xv) releasing mechanical tension from keratin fibers, xvi) rinsing off the keratin fibers and optionally shampooing the keratin fibers, with the provision that steps xi) and xii) as well as steps xv) and xvi) may be performed in any order.

Thus, mechanical tension as defined in step xi) is, for example, provided by putting the keratin fibers on curlers or by straightening the fibers by comb and brush.

The composition as defined in step xii) comprises one or more sulfur-based reducing agent(s). In principle, any inorganic or organic sulphur-based reducing agent and/or their mixtures are suitable for the purpose of the present invention.

Suitable inorganic sulfur-based reducing agents are sulfite and/or hydrogen sulfite salts such as sodium, potassium, and ammonium salts. Suitable organic sulphur-based reducing agents are thiogylcolic acid and/or its salts, cysteamine and/or its salts, thio-glycerin and/or its salts, glycerin esters of thioglycolic acid and/or its salts, thiolacetic acid and/or its salts, cysteine or its derivatives and/or its salts, and/or their mixtures. Preferred are thioglycolic acid and/or its salts, thiolacetic acid and/or its salts, cysteine or its derivatives and/or its salts and sodium, potassium, ammonium sulfites and their mixtures, form the viewpoint of cosmetic safety. The most preferred reducing agents are thioglycolic acid and/or its salts and sodium, potassium, ammonium sulfites, and/or their mixtures, form the viewpoint of cosmetic safety.

It is preferred that the total concentration of reducing agents in the composition of step xii) is in the range of 0.5% to 20% by weight, more preferably 1% to 15% by weight, still more preferably 2% to 12% by weight, and still more preferably 3% to 10% by weight, calculated to the total weight of the composition of step xii).

The pH of the composition may be acidic or alkaline and is in the range of 3 to 12, preferably 4 to 11, and most preferably it is alkaline and in the range of 7.5 to 10.5, from the viewpoint of reducing power. The pH may be adjusted with the known organic and/or inorganic acids and alkalizing agents (see above for dyeing and bleaching).

The composition of step xii) is left on the hair for a period of 1 to 60 min, preferably for a time period of 2 min to 45 min, more preferably for a time period of 5 min to 30 min, and further more preferably for a time period of 5 min to 20 min at ambient temperature. Optionally heat may be applied.

Then to keratin fibers is applied in step xiv) a composition comprising one or more oxidizing agent(s) and left for a time period of 1 min to 30 min. It is preferred from the viewpoint of hair damage and oxidation performance that the composition is left on keratin fibers for 2 min to 25 min, more preferably for 3 min to 20 min, and further more preferably for 5 min to 15 min, optionally while applying heat and/or under use of heating device. Suitable oxidizing agent(s) are hydrogen peroxide and sodium bromate. Suitable concentration of oxidizing agent(s) is in the range of 1% to 15% by weight, preferably 3% to 12% by weight, calculated to the total weight of the composition of step xiv).

In one aspect of the present invention, after the reducing treatment and prior to the oxidizing treatment, a non-reducing and non-oxidizing aqueous composition comprising one or more alkalizing agent and having a pH in the range of 7.5 to 12, preferably 8 to 11, more preferably 8.5 to 10.5 and most preferably 8.5 to 10, is applied onto fibers and left on the fibers for a period 1 to 60 min.

The preferred alkalizing agent of the non-reducing and non-oxidizing aqueous composition is ammonia and/or its salt(s).

Permanent Shaping Treatments with Heating Step

Typical permanent shaping treatments for keratin fibers having a step of applying an alkaline composition comprising ammonia and/or one or more ammonium salt(s), and having a step of heating the keratin fibers in a temperature range from 50° C. 180° C. comprise the following steps:

xx) putting keratin fibers under mechanical tension, xxi) applying to keratin fibers an non-reducing, non-oxidizing alkaline composition with a pH in the range of 7 to 12 comprising one or more alkalizing agent(s), preferably selected from ammonia and/or its salts, and xxii) optionally covering keratin fibers with a moisture barrier, xxiii) heating the keratin fibers to a temperature in the range of 50° C. to 230° C. for a time period of 1 min to 60 min, xxiv) optionally removing the moisture barrier from keratin fibers, xxv) releasing tension from keratin fibers, xxvi) optionally rinsing-off the keratin fibers, wherein process steps xx), xxi), and xxv), xxvi) can be executed in either order.

It is preferred from the viewpoint of shaping performance that the concentration of ammonia and/or ammonium salt(s) is in the range of 0.1% to 10% by weight, more preferably in the range of 0.2% to 8% by weight, further more preferably in the range of 0.5% to 6% by weight, calculated to the total weight of the composition of step xxi).

Permanent and/or semi-permanent oxidative dyeing treatments

The composition of the present invention can also be used to counteract malodour resulting from oxidative dyeing having a step of applying a composition comprising ammonia and/or ammonium salt(s) of keratin fibers, preferably human keratin fibers, more preferably human hair. Typically, oxidative dyeing methods comprise the steps of:

xxx) mixing an aqueous oxidative dyeing composition having a pH in the range of 7 to 12 and comprising one or more oxidative dye precursors and/or oxidative dye couplers and ammonia and/or one or more ammonium salt(s) with an aqueous oxidative composition having a pH in the range of 1 to 6 to prepare a ready-to-use composition having a pH in the range of 7 to 12, xxxi) applying the ready-to-use composition onto keratin fibers and leaving it for a time period of 1 to 60 min, xxxii) rinsing off the keratin fibers and optionally shampooing the keratin fibers.

Suitable oxidative dye precursors for the composition of step xxx) are, for example, p-phenylendiamine and/or its derivatives, p-aminophenol and/or its derivatives, and heterocyclic compounds such as diaminopyrazols and substituted pyrimidines and/or their derivatives and/or their salts.

Furthermore, besides oxidative dye precursors, the oxidative dyeing composition of step xxx) may comprise oxidative dye couplers. Suitable oxidative dye couplers are resorcinol and/or its derivatives, m-aminophenol and/or its derivatives, m-phenylenediamine and/or its derivatives, pyridines and/or its derivatives, and naphthol and/or its derivatives, and/or their salts.

The suitable total concentration of oxidative dye precursors and/or oxidative dye couplers is in the range of 0.001% to 5% by weight, preferably in the range of 0.01% to 4% by weight, more preferably in the range of 0.05% to 3% by weight, still more preferably in the range of 0.1% to 2% by weight, calculated to the total weight of the oxidative dyeing composition of step xxx) before mixing.

The oxidative dyeing composition of step xxx) comprises ammonia and/or one or more ammonium salt(s). Suitable ammonium salt(s) are ammonium carbonate, ammonium bicarbonate, ammonium sulfate, and ammonium phosphate. Suitable total concentrations of ammonia and/or one or more ammonium salt(s) in the oxidative dying composition of step xxx) before mixing is in the range of 0.1% to 10% by weight, preferably 0.5% to 8% by weight, more preferably in the range of 0.75% to 5% by weight, calculated to the total weight of the oxidative dying composition of step xxx) prior to mixing.

Suitably, the oxidative dyeing composition of step xxx) may comprise one or more alkalizing agent different from ammonia and/or ammonium salt(s). Preferably, one or more alkalizing agent(s) different from ammonia and/or ammonium salt(s) is selected from alkyl- or alkanolamines according to the general structure

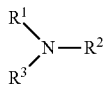

[Chem.1]

wherein $R^1$, $R^2$, and $R^3$ are same or different H, from $C_1$ to $C_4$, $C_3$ to $C_4$ unsaturated alkyl, $C_3$ to $C_4$ branched alkyl, $C_1$ to $C_4$ hydroxyl alkyl, $C_3$ to $C_4$ unsaturated hydroxyl alkyl, $C_3$ to $C_4$ branched hydroxyl alkyl, with the condition that at least one of $R^1$, $R^2$, or $R^3$ is different from H.

It is further preferred from the viewpoint of sufficient alkalinity and dyeing intensity that the concentration of alkalizing agents in the oxidative dyeing composition of step xxx) before mixing is in the range of 0.25% to 15% by weight, more preferably in the range of 0.5% to 12.5% by weight, still more preferably in the range of 0.75% to 10% by weight, and still more preferably in the range of 1% to 7.5% by weight, calculated to the total weight of the oxidative dyeing composition of step xxx) before mixing.

The dyeing composition of step xxx) before mixing has a pH in the range of 7 to 12. It is preferred from the viewpoint of buffering capacity that the pH of the dyeing composition of step xxx) before mixing is in the range of 7.5 to 11, more preferably in the range of 8.0 to 10, still more preferably in the range of 8.5 to 9.5.

The dyeing composition of step xxx) is then mixed with aqueous oxidative composition having a pH in the range 1 to 6 to form a ready-to-use composition. Suitable mixing ratios by weight are 5:1 to 1:5 (oxidative dyeing composition:aqueous oxidative composition). Customarily, suitable mixing ratios are 1:1, 1:2, and 1:3 by weight (oxidative dyeing composition:aqueous oxidative composition).

Suitably, the pH of the ready-to-use composition is in the range of 7 to 12. It is preferred from the viewpoint of accelerated dyeing speed that the pH of the ready-to-use composition is in the range of 7.5 to 11, more preferably 8.0 to 10.5.

The ready-to-use composition is then applied to keratin fibers and left for a time period of 1 min to 60 min as defined in step xxxi). Preferred time ranges for step xxxi) are 5 min to 45 min, more preferred ranges are 10 min to 35 min, from the viewpoint of sufficiently developing the oxidative hair color.

During the application time of the ready-to-use mixture, heat may be applied to the keratin fibers, preferably in a temperature range from 30° C. to 50° C., from the viewpoint of accelerating dyeing speed and cosmetic safety.

After that, the ready-to-use composition is rinsed-off from keratin fibers in step xxxii) and optionally they are shampooed and optionally blow-dried.

Bleaching Treatments

The fragrance composition of the present invention can also be used to counteract malodour resulting from bleaching and/or lightening of keratin fibers, preferably human keratin fibers, more preferably human hair, a step of applying a composition comprising ammonia and/or ammonium salt(s). Such bleaching and/or lightening methods typically comprise the steps of:

xxxx) mixing a bleach powder composition comprising one or more persalt(s) and/or peroxy salt(s) and one or more alkalizing agent(s) with an aqueous oxidizing composition having a pH in the range of 1 to 6 to prepare a ready-to-use composition having a pH in the range of 7 to 12, xxxxi) applying the ready-to-use composition onto keratin fibers and leaving it for a time period in the range of 1 to 60 min, xxxxii) rinsing off the keratin fibers and optionally shampooing the keratin fibers.

The bleach powder composition of step xxxx) comprises one or more persalt(s) and/or peroxy salt(s). Suitable persalts and/or peroxy salts are ammonium persulfate, sodium persulfate, potassium persulfate, earth alkali peroxides such as magnesium peroxide, melamine peroxide or urea peroxide or phthalimidoperoxy hexanoic acid. The preferred persalts from the viewpoint of bleaching power are ammonium persulfate.

It is preferred from the viewpoint of bleaching power and cosmetic safety that the total concentration of persalts and/or peroxy salts in the bleach powder composition of step xxxx) before mixing is in the range of 10% to 80% by weight, preferably in the range of 15% to 70% by weight, more preferably in the range of 20% to 60% by weight, and still more preferably in the range of 25% to 60% by weight, calculated to the total weight of the bleach powder composition of step xxxx) before mixing.

The bleach powder composition of step xxxx) further comprises one or more alkalizing agent(s). Suitable alkalizing agent(s) are metasilicates, in particular sodium metasilicate. It is preferred from the viewpoint of alkalinity that the concentration of metasilicates in the bleach powder composition of step xxxx) before mixing is in the range of 1% to 20% by weight, more preferably 5% to 15% by weight, calculated to the total weight of the bleach powder composition of step xxxx) before mixing.

Other suitable alkalizing agent(s) are carbonate and bicarbonate alkali salts such as ammonium, sodium, and potassium. The preferred salts are bicarbonate salts and especially preferred is ammonium bicarbonate, from the viewpoint of buffer capacity. Suitable concentration of carbonates in the bleach powder composition of step xxxx) is in the range of 0.25% to 10% by weight, preferably in the range of 0.5% to 7.5% by weight, more preferably in the range of 0.75% to 5% by weight, and still more preferably in the range of 1% to 4% by weight, calculated to the total weight of the bleach powder composition before mixing, from the viewpoint of buffer capacity and low hair damage.

The bleach powder composition of step xxxx) is then mixed with an aqueous oxidizing composition having a pH in the range of 1 to 6 to form a ready-to-use composition.

Suitable mixing ratios by weight are 5:1 to 1:5 (bleach powder composition:aqueous oxidizing composition). Customarily, suitable mixing ratios are 1:1, 1:2, and 1:3 by weight (bleach powder composition:aqueous oxidizing composition).

Suitably, the pH of the ready-to-use composition is in the range of 7 to 12. It is preferred from the viewpoint of accelerated bleaching and/or lightening that the pH of the ready-to-use composition is in the range of 7.5 to 11, more preferably 8.0 to 10.5.

The ready-to-use composition is then applied to keratin fibers and left for a time period of 1 min to 60 min as defined in step xxxxi). Preferred time ranges for step xxxxi) are 5 min to 45 min, more preferred ranges are 10 min to 35 min, from the viewpoint of bleaching performance.

Optionally, heat may be applied while leaving the ready-to-use composition onto keratin fibers. Suitable temperature ranges are 30° C. to 50° C.

After that, the ready-to-use composition is rinsed-off from keratin fibers according to step xxxxii) and optionally they are shampooed and optionally blow-dried.

Semi-Permanent Keratin Fiber Straightening Treatments

The composition of the present invention can also be used to counteract malodour resulting from semi-permanent keratin fiber straightening treatment(s) comprising a step of applying an acidic composition comprising glyoxylic acid followed by a heating step of keratin fibers at a temperature range from 50° C. to 230° C.

Typically, such treatments include the steps of:
(xxxxx) application of a keratin fiber straightening composition onto the hair having a pH in the range of 1 to 4 and comprising glyoxylic acid and/or its salt(s) and/or its hydrate(s);
(xxxxxi) leaving the composition on the hair for a time period of 1 to 120 minutes;
(xxxxxii) optionally rinsing off the hair;
(xxxxxiii) drying the hair;
(xxxxxiv) treating the hair with an iron having a surface temperature of 50° C. to 230° C.; and
(xxxxxv) optionally rinsing off and/or shampooing the hair and drying.

Suitably, the concentration of glyoxylic acid and/or its salt(s) and/or its hydrate(s) in the composition of step xxxxx) is in the range of 0.1% to 40% by weight, preferably in the range of 0.5% to 30% by weight, further more preferably in the range of 1% to 20% by weight, calculated to the total weight of the composition of step xxxxx).

Suitable time period for leaving the composition onto keratin fibers is in the range of 1 min to 120 min, preferably in the range of 5 min to 60 min, more preferably in the range of 10 min to 45 min.

It is preferred from the viewpoint of increasing permanency that the keratin fibers are treated by several subsequent strokes of the iron in step xxxxxiv), preferably by 3-6 strokes per streak with the iron.

Suitably, temperatures of the iron in step xxxxxiv) are in the range of 50° C. to 230° C., preferably 80° C. to 210° C., further more preferably 150° C. to 210° C.

The present invention further discloses the following compositions:

<1> A fragrance composition for reducing malodor during chemical treatments of keratin fibers, preferably human keratin fibers, more preferably human hair, comprising the following compounds a), b), c) and e) and one or more organic solvents selected from the group consisting of benzyl alcohol, dipropylene glycol, isopropyl myristate, and ethanol in an amount of 1% by weight or more calculated to the total weight of the composition:
a) p-mentha-8-thiol-3-one,
b) cis-3-hexenol,
c) cis-3-hexenyl acetate,
e) allyl amyl glycolate.

<2> The composition as set forth in clause <1>, wherein the concentration of compound b) is in the range of 0.1% to 25% by weight, preferably in the range of 0.1% to 5% by weight, more preferably in the range of 0.25% to 3% by weight, still more preferably in the range of 0.5% to 2.8% by weight, still further more preferably in the range of 1% to 2.6% by weight, still further more preferably in the range of 1% to 2.5% by weight calculated to the total weight of the composition.

<3> The composition as set forth in clauses <1> or <2>, wherein the concentration of compound c) is in the range of 0.1% to 5% by weight, preferably in the range of 0.25% to 3% by weight, further more preferably in the range of 0.5% to 2% by weight, still further more preferably in the range of 0.7% to 1.5% by weight, calculated to the total weight of the composition.

<4> The composition as set forth in any of the clauses <1> to <3>, wherein the concentration of compound a) is in the range of 0.001% to 0.15% b weight, preferably in the range of 0.001% to 0.08% by weight, more preferably in the range of 0.001% to 0.05% by weight, still more preferably in the range of 0.0025% to 0.03% by weight, still further more preferably in the range of 0.005% to 0.02% by weight, still further more preferably in the range of 0.01% to 0.0175% by weight, still further more preferably 0.01% to 0.015% by weight calculated to the total weight of the composition.

<5> The composition as set forth in any of the clauses <1> to <4>, wherein the concentration of compound e) is in the range of 0.01% to 8% by weight, preferably in the range of 0.01% to 3% by weight, more preferably in the range of 0.1% to 1.5% by weight, further more preferably in the range of 0.25% to 1% by weight, still further more preferably in the range of 0.3% to 0.75% by weight, calculated to the total weight of the composition.

<6> The composition as set forth in any of the clauses <1> to <5>, comprises:
compound a) at a concentration in the range of 1% to 2.6% by weight,
compound b) at a concentration in the range of 0.7% to 1.5% by weight,
compound c) at a concentration in the range of 0.01% to 0.0175% by weight,
compound e) at a concentration in the range of 0.3% to 0.75% by weight, each calculated to the total weight of the composition.

<7> The composition as set forth in any of the clauses <1> to <5>, comprises:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.25% to 1% by weight, each calculated to the total weight of the composition.

<8> The composition as set forth in any of the clauses <1> to <5>, comprises:
compound a) at a concentration in the range of 0.005% to 0.02% by weight,
compound b) at a concentration in the range of 1% to 2.6% by weight,
compound c) at a concentration in the range of 0.7% to 1.5% by weight,
compound e) at a concentration in the range of 0.3% to 0.75% by weight, each calculated to the total weight of the composition.

<9> The composition as set forth in any of the clauses <1> to <5>, comprises:
compound a) at a concentration in the range of 0.01% to 0.0175% by weight,
compound b) at a concentration in the range of 1% to 2.6% by weight,
compound c) at a concentration in the range of 0.5% to 2% by weight,
compound e) at a concentration in the range of 0.3% to 0.75% by weight, each calculated to the total weight of the composition.

<10> The composition as set forth in any of the clauses <1> to <5>, comprises:
compound a) at a concentration in the range of 0.01% to 0.0175% by weight,
compound b) at a concentration in the range of 0.5% to 2.8% by weight,
compound c) at a concentration in the range of 0.7% to 1.5% by weight,
compound e) at a concentration in the range of 0.3% to 0.75% by weight, each calculated to the total weight of the composition.

<11> The composition as set forth in any of the clauses <1> to <5>, comprises:
compound a) at a concentration in the range of 0.005% to 0.02% by weight,
compound b) at a concentration in the range of 0.5% to 2.8% by weight,
compound c) at a concentration in the range of 0.5% to 2% by weight,
compound e) at a concentration in the range of 0.25% to 1% by weight, each calculated to the total weight of the composition.

<12> The composition as set forth in any of the clauses <1> to <11>, further comprises one or more organic solvent(s), preferably one or more selected from benzyl alcohol, dipropylene glycol, isopropyl myristate and ethanol.

<13> The composition as set forth in clause <12>, wherein the total concentration of organic solvents, preferably one or more selected from benzyl alcohol, dipropylene glycol, isopropyl myristate and ethanol, is in the range of 1% to 99% by weight, preferably 5% to 90% by weight, further more preferably in the range of 6% to 85% by weight, still further more preferably 10% to 80% by weight, still further more preferably in the range of 30% to 80% by weight, still further more preferably 40% 80% by weight, calculated to the total weight of the composition.

<14> The composition as set forth in any of the clauses <12> or <13>, comprises:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
organic solvent(s), preferably one or more selected from benzyl alcohol, dipropylene glycol, isopropyl myristate, and ethanol, at a total concentration in the range of 10% to 30% by weight, each calculated to the total weight of the composition.

<15> The composition as set forth in any of the clauses <12> or <13>, comprises:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
organic solvent(s), one or more preferably selected from benzyl alcohol, dipropylene glycol, isopropyl myristate, and ethanol, at a total concentration in the range of 60% to 90% by weight, each calculated to the total weight of the composition.

<16> The composition as set forth in any of the clauses <1> to <15>, further comprises limonene.

<17> The composition as set forth in clause <16>, wherein the total concentration of limonene is in the range of 0.1% to 40% by weight, preferably in the range of 0.5% to 20% by weight, more preferably in the range of 1% to 12% by weight, still further more preferably 3% to 12% by weight, calculated to the total weight of the composition.

<18> The composition as set forth in clauses, <16> or <17> comprises:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 1% to 40% by weight,
organic solvent(s), preferably one or more selected from benzyl alcohol, dipropylene glycol, isopropyl myristate, and ethanol, at a total concentration in the range of 10% to 30% by weight, each calculated to the total weight of the composition.

<19> The composition as set forth in clauses <16> or <17>, comprises:
compound a) at a concentration in the range of 0.01% to 0.0175% by weight,
compound b) at a concentration in the range of 1% to 2.6% by weight,
compound c) at a concentration in the range of 0.7% to 1.5% by weight,
compound e) at a concentration in the range of 0.3% to 0.75% by weight,
limonene at a total concentration in the range of 1% to 20% by weight,
organic solvent(s), preferably one or more selected from benzyl alcohol, dipropylene glycol, isopropyl myristate, and ethanol, at a total concentration in the range of 60% to 90% by weight, each calculated to the total weight of the composition.

<20> The composition as set forth in clauses <16> or <17>, comprises:
  compound a) at a concentration in the range of 0.01% to 0.0175% by weight,
  compound b) at a concentration in the range of 1% to 2.6% by weight,
  compound c) at a concentration in the range of 0.7% to 1.5% by weight,
  compound e) at a concentration in the range of 0.3% to 0.75% by weight,
  limonene at a total concentration in the range of 3% to 15% by weight,
  organic solvent(s), preferably one or more selected from benzyl alcohol, dipropylene glycol, isopropyl myristate, and ethanol, at a total concentration in the range of 10% to 30% by weight, each calculated to the total weight of the composition.

<21> The composition as set forth in clauses <16> or <17>, comprises:
  compound a) at a concentration in the range of 0.01% to 0.0175% by weight,
  compound b) at a concentration in the range of 1% to 2.6% by weight,
  compound c) at a concentration in the range of 0.7% to 1.5% by weight,
  compound e) at a concentration in the range of 0.3% to 0.75% by weight,
  limonene at a total concentration in the range of 3% to 15% by weight,
  organic solvent(s), preferably one or more selected from benzyl alcohol, dipropylene glycol, isopropyl myristate, and ethanol, at a total concentration in the range of 60% to 90% by weight, each calculated to the total weight of the composition.

The present invention further discloses the following absorbent solid substrate:

<22> An absorbent solid substrate being impregnated with or entrapping the composition as defined in any of the clauses <1> to <21>.

<23> The absorbent solid substrate as set forth in clause <22>, wherein the absorbent solid substrate is a sheet, a particle or plurality of particles, preferably a plurality of resin particles, or a sponge.

<24> The absorbent solid substrate as set forth in any of the clauses <22> or <23>, wherein comprises natural and/or synthetic polymers fibers.

<25> The absorbent solid substrate as set forth in clause <24>, wherein natural polymer fibers are selected from cellulose, starch, and/or alginate, and/or synthetic polymer fibers are selected from fibers comprising optionally alkylated acrylate, optionally alkylated methacrylate, or vinylpyrrolidone fibers.

<26> The absorbent solid substrate as set forth in any of the clauses <24> or <25>, wherein natural polymer fibers are selected from crosslinked cellulose, crosslinked starch, and/or crosslinked alginate, and/or synthetic polymer fibers are selected from fibers comprising optionally alkylated crosslinked acrylate, optionally alkylated crosslinked methacrylate, or crosslinked vinylpyrrolidone fibers.

<27> The absorbent solid substrate as set forth in any of the clauses <22> to <26>, wherein the absorbent solid substrate is a gel, preferably a hydrogel, entrapping the fragrance composition as defined above.

<28> The absorbent solid substrate as set forth in any of the clauses <22> to <27>, wherein the absorbent solid substrate is configured to absorb at least 10% by weight of the fragrance composition, calculated to the total weight of the absorbent solid substrate.

The present invention also discloses the following fragrance container:

<29> A fragrance container for a scent dispenser comprising:
  a container body configured to store fragrance compositions,
  one or more outlet(s) for liquid and/or gas,
  optionally a container seal for sealing the one or more outlet(s) of the container,
  the fragrance composition as defined in any of the clauses <1> to <21>.

<30> The fragrance container as set forth in clause <29>, wherein the container body is configured to store liquid fragrance compositions.

<31> The fragrance container as set forth in clauses <29> or <30>, wherein the container comprises the fragrance composition as defined in any of the clauses <1> to <21> in liquid form, optionally diluted with one or more organic solvent(s), preferably one or more selected from benzyl alcohol, dipropylene glycol, isopropyl myristate and ethanol, with a weight ratio of fragrance composition to organic solvent in the range of 1:1 to 1:100, preferably in the range of 1:2 to 1:50, more preferably in the range of 1:2 to 1:10.

<32> The fragrance container as set forth in any of the clauses <29> to <31>, wherein the container comprises:
  a container body configured to store fragrance compositions,
  one or more outlet(s) for liquid and/or gas,
  optionally a container seal for sealing the one or more outlet(s) of the container,
  the fragrance composition as defined in any of the clauses <1> to <21> being diluted with one or more organic solvent(s), preferably one or more selected from benzyl alcohol, dipropylene glycol, isopropyl myristate and ethanol, with a weight ratio of fragrance composition to organic solvent in the range of 1:1 to 1:100, preferably in the range of 1:2 to 1:50, more preferably in the range of 1:2 to 1:10.

<33> The fragrance container as set forth in clause <29>, wherein the container body is configured to store absorbent solid substrates being impregnated with the fragrance composition as defined in any of the clauses <1> to <21>.

<34> The fragrance container as set forth in clause <29>, wherein the container body comprises a gel that entraps the fragrance composition.

<35> The fragrance container as set forth in any of the clauses <29> to <33> characterized in that the container body comprises a plurality of particles being impregnated with the fragrance composition as defined in any of the clauses <1> to <21>.

The present invention also discloses the following scent dispenser:

<36> A scent dispenser for dispensing fragrance into the air of closed rooms comprising the fragrance composition as defined in any of the clauses <1> to <21>.

<37> The scent dispenser as set forth in clause <36>, which is an aerosol vaporizer or a pump vaporizer.

<38> The scent dispenser as set forth in any of the clauses <36> or <37>, wherein further comprises one or more propellant(s).

<39> The scent dispenser as set forth in clause <36>, wherein the scent dispenser is an electric scent dispenser having:
  one or more electrical power connection(s) and/or one or more electrical power source(s) for providing electrical power to the dispensing means,
  a body having one or more dispensing means for continuously or sequentially dispensing fragrance compositions,
  a refillable and/or exchangeable container comprising the composition as defined above.

<40> The scent dispenser as set forth in clauses <36> or <39>, wherein one or more dispensing means for continuously or sequentially dispensing fragrance compositions is an electrical fan within the body configured to allow for an air-stream over the refillable and/or exchangeable container comprising the composition as defined in any of the clauses <1> to <21>.

<41> The scent dispenser as set forth in clause <36>, wherein the scent dispenser is an electric vaporizer having
  one or more electrical power connection(s) and/or one or more electrical power source(s) for providing electrical power to the vaporizing means,
  a body having one or more vaporizing means for continuously or sequentially vaporizing fragrance compositions,
  a refillable and/or exchangeable container comprising the composition as set forth in any of the clauses <1> to <21>.

<42> The scent dispenser as set forth in clauses <37> or <41>, wherein the one or more vaporizing means is one or more venturi nozzle(s), one or more ultrasonic vibrator(s), one or more jet vaporizer(s), or one or more vibrating mesh vaporizer(s).

<43> The scent dispenser as set forth in clause <42>, wherein the ultrasonic vibrator comprises one or more piezoelectric element(s).

<44> The scent dispenser as set forth in clause <42>, wherein the jet vaporizer comprises one or more compressor(s) for compressing gas, preferably for compressing air.

<45> The scent dispenser as set forth in clause <42>, wherein the vibrating mesh vaporizer comprises a membrane with a plurality of holes.

<46> The scent dispenser as set forth in any of clauses <37> and <41> to <45>, wherein comprises one or more control unit(s) for controlling the vaporization rate, preferably selected from microprocessors, microcontrollers, digital integrated circuits, or analog circuits.

<47> The scent dispenser as set forth in clause <46>, wherein comprises one or more sensors for measuring the aerosol flow from the vaporizing means.

<48> The scent dispenser as set forth in clauses <46> or <47>, wherein the scent dispenser is configured to receive and process electronic signals from one or more sensors measuring the aerosol flow from the vaporizing means and to adjust the vaporization rate of the vaporizing means in response to that signal.

The present invention also discloses the following method for reducing malodor:

<49> A method for reducing malodor during chemical treatments of keratin fibers, preferably human keratin fibers, more preferably human hair, in closed rooms comprising the steps of:
  i) vaporizing the composition as defined in any of the clauses <1> to <21> into the air of the closed room,
  ii) treating keratin fibers with one or more permanent and/or semi-permanent chemical treatment(s) in the same closed room,
  with the provision that step i) may be performed prior to and/or during step ii).

<50> The method as set forth in clause <49>, wherein the permanent and/or semi-permanent chemical treatment (s) are selected from:
  permanent shaping treatments for keratin fibers having a step of applying a composition comprising one or more sulfur-based reducing agent(s) and optionally ammonia and/or ammonium salt(s),
  permanent shaping treatments for keratin fibers having a step of applying an alkaline composition comprising ammonia and/or one or more ammonium salt(s), and having a step of heating the keratin fibers in a temperature range from 50° C. 180° C.,
  permanent and/or semi-permanent oxidative dyeing and/or bleaching treatments for keratin fibers having a step of applying a composition comprising ammonia and/or ammonium salt(s),
  semi-permanent keratin fiber straightening treatment(s) comprising a step of applying an acidic composition comprising glyoxylic acid followed by a heating step of keratin fibers at a temperature range from 50° C. to 230° C.

<51> The method as set forth in clauses <49> or <50>, wherein step i) commences at least 10 min prior to commencing with step ii) and the composition is continuously or sequentially vaporized during the treatment processes of step ii).

<52> The method as set forth clause <50> or <51>, wherein permanent shaping treatments for keratin fibers having a step of applying a composition comprising one or more sulfur-based reducing agent(s) and optionally ammonia and/or ammonium salt(s), comprise the steps of:
  x) optionally shampooing the keratin fibers,
  xi) putting hair under mechanical tension,
  xii) applying to keratin fibers an aqueous composition having a pH in the range of 3 to 12 comprising one or more sulfur-based reducing agent(s) and one or more alkalizing agent(s), and leaving the composition for a time period in the range of 1 min to 60 min,
  xiii) optionally rinsing off the composition,
  xiv) providing a composition comprising one or more oxidizing agent(s), applying it to keratin fibers and leaving it for a time period in the range of 1 min to 30 min,
  xv) releasing mechanical tension from keratin fibers,
  xvi) rinsing off the keratin fibers and optionally shampooing the keratin fibers, with the provision that steps xi) and xii) as well as steps xv) and xvi) may be performed in any order.

<53> The method as set forth in clause <52>, wherein after the reducing treatment and prior to the oxidizing treatment, a non-reducing and non-oxidizing aqueous composition comprising one or more alkalizing agent and having a pH in the range of 7.5 to 12, preferably 8 to 11, more preferably 8.5 to 10.5 and most preferably 8.5 to 10, is applied onto fibers and left on the fibers for a period 1 to 60 min.

<54> The method as set forth in clause <53>, wherein the alkalizing agent of the non-reducing and non-oxidizing aqueous composition is ammonia and/or its salt(s).

<55> The method as set forth in clauses <50> or <51>, wherein permanent shaping treatments for keratin fibers having a step of applying an alkaline composition comprising ammonia and/or one or more ammonium salt(s), and having a step of heating the keratin fibers in a temperature range from 50° C. 180° C. comprise the following steps:
xx) putting keratin fibers under mechanical tension,
xxi) applying to keratin fibers an non-reducing, non-oxidizing alkaline composition with a pH in the range of 7 to 12 comprising one or more alkalizing agent(s), preferably selected from ammonia and/or its salts, and
xxii) optionally covering keratin fibers with a moisture barrier,
xxiii) heating the keratin fibers to a temperature in the range of 50° C. to 230° C. for a time period of 1 min to 60 min,
xxiv) optionally removing the moisture barrier from keratin fibers,
xxv) releasing tension from keratin fibers,
xxvi) optionally rinsing-off the keratin fibers,
wherein process steps xx), xxi), and xxv), xxvi) can be executed in either order,
<56> The method as set forth in clauses <50> or <51>, wherein the oxidative dyeing methods comprise the steps of:
xxx) mixing an aqueous oxidative dyeing composition having a pH in the range of 7 to 12 and comprising one or more oxidative dye precursors and/or oxidative dye couplers and ammonia and/or one or more ammonium salt(s) with an aqueous oxidative composition having a pH in the range of 1 to 6 to prepare a ready-to-use composition having a pH in the range of 7 to 12,
xxxi) applying the ready-to-use composition onto keratin fibers and leaving it for a time period of 1 to 60 min,
xxxii) rinsing off the keratin fibers and optionally shampooing the keratin fibers.
<57> The method as set forth in clauses <50> or <51>, wherein the bleaching treatments comprise the steps of:
xxxx) mixing a bleach powder composition comprising one or more persalt(s) and/or peroxy salt(s) and one or more alkalizing agent(s) with an aqueous oxidizing composition having a pH in the range of 1 to 6 to prepare a ready-to-use composition having a pH in the range of 7 to 12,
xxxxi) applying the ready-to-use composition onto keratin fibers and leaving it for a time period in the range of 1 to 60 min,
xxxxii) rinsing off the keratin fibers and optionally shampooing the keratin fibers.
<58> The method as set forth in clauses <50> or <51>, wherein the semi-permanent straightening treatments comprise the steps of:
(xxxxx) application of a keratin fiber straightening composition onto the hair having a pH in the range of 1 to 4 and comprising glyoxylic acid and/or its salt(s) and/or its hydrate(s);
(xxxxxi) leaving the composition on the hair for a time period of 1 to 120 minutes;
(xxxxxii) optionally rinsing off the hair;
(xxxxxiii) drying the hair;
(xxxxxiv) treating the hair with an iron having a surface temperature of 50° C. to 230° C.,
(xxxxxv) optionally rinsing off and/or shampooing the hair and drying.

EXAMPLES

The following fragrance composition was prepared by adding the individual fragrance compounds to dipropylene glycol solvent:

TABLE 1

| Ingredient | Inventive composition 1 |
| --- | --- |
| a) p-mentha-8-thiol-3-one | 0.015 wt % |
| b) cis-3-hexenol | 2.5 wt % |
| c) cis-3-hexenyl acetate | 0.6 wt % |
| e) allyl amyl glycolate | 0.5 wt % |
| Dipropylene glycol | Ad 100.0 wt % |

Example 1

1 g of the compositions from above were dropped and absorbed onto 10 g of acrylate resin particles.

6 human volunteers were invited to receive a permanent reshaping treatment in a closed hair salon. The hair reshaping treatment was as follows:

Aqueous Reducing Composition

|  | % by weight |
| --- | --- |
| Ammonium thioglycolate | 10 |
| Ammonium hydroxide | 2 |
| Water | to 100 |

The pH of the above composition was adjusted to pH 8.5.

Aqueous Alkaline Composition

|  | % by weight |
| --- | --- |
| Ammonium chloride | 2 |
| Ammonium hydroxide | 4 |
| Water | to 100 |

The pH of the above composition was adjusted with sodium hydroxide to pH 10.0.

Aqueous Oxidizing Composition

|  | % by weight |
| --- | --- |
| Hydrogen peroxide | 3 |
| Phosphoric acid | q.s. to pH 3 |
| Water | to 100 |

Firstly, the hair was washed with a commercially available shampoo composition and towel dried. Afterwards, to hair was applied an aqueous reducing composition and left for 15 min and then rinsed off with water.

In the middle of that process, customers and hair dressers were asked to rate the sulfur and ammonia odor without fragrance and to rate the sulfur and ammonia odor while putting their noses over the fragrance compositions of above (step 1).

Then the hair was put on curlers having a diameter of 1.5 cm. Then to hair was applied the alkaline composition and left for 10 min.

In the middle of that process, customers and hair dressers were asked to rate the ammonia odor without fragrance and to rate the ammonia odor while putting their noses over the fragrance compositions of above (step 2).

Subsequently, to hair was applied the oxidizing composition and after 15 min the oxidizing composition was rinsed off with water and the curlers were taken off. Then the hair was dried with a hair dryer.

Customers and hair dressers were asked to rate with integer numbers between 0 and 5 with 0 corresponding to "no chemical odor" and 5 corresponding to "strong, stringent, and stinging chemical odor". The customers and between 4-6 hair dressers evaluated each step. The median number of their evaluation is reported below:

TABLE 2

| Composition | Step 1 | Step 2 |
|---|---|---|
| No fragrance composition | 4 | 5 |
| Inventive composition 1 | 1 | 2 |

Example 2

A jet vaporizer (product name: Air Design FLOW, purchased from Commons Co., Ltd.) has been filled with the inventive composition 1 from above.

The composition of above was then vaporized into a 40 m² closed hair salon room. After about 10 min, the permanent reshaping service was commenced at a frequency of about once every 2 h, and additionally oxidative dyeing treatments emitting ammonia odor was performed in parallel at a frequency of about once every 2 h.

As a result, the amount of fragrance compounds vaporized per hour with respect to the size of space (m²) represented by the following formula 1 was 0.16 mg·hr$^{-1}$·m$^{-2}$.

(Amount of fragrance compounds vaporized per hour with respect to size of space [mg·hr$^{-1}$·m$^{-2}$])=(total weight ratio of the fragrance compounds $a$), $b$), $c$), and $e$) in the fragrance composition to be vaporized)·(vaporization rate of the fragrance composition [mg·hr$^{-1}$]/(size of space [m²])  (Formula 1)

(Condition)
Total weight ratio of fragrance compounds in fragrance composition: 0.036
Vaporization rate of fragrance composition: 180 mg/hr
Size of space: 40 m²
10 non-involved individuals were asked to rate the malodor 15 min after commencing with the first treatment when entering the closed room the first time.

The individuals were asked to rate with integer numbers between 0 and 5 with 0 corresponding to "no chemical odor" and 5 corresponding to "strong, stringent, and stinging chemical odor" The median number of their evaluation is reported below:
  10% of the individuals rated the malodor in the room with 2
  80% of the individuals rated the malodor in the room with 1.
  10% of the individuals rated the malodor in the room with 0.

On another day, without fragrance vaporization and with performing the same chemical services with the same frequency of above, other individuals were invited to comment on their malodor perception using the same valuation method.
  20% of the individuals rated the malodor in the room with 4
  80% of the individuals rated the malodor in the room with 3.

Example 3

A vaporizer (product name: Air Design FLOW, purchased from Commons Co., Ltd.) has been filled with the inventive composition 1 from above without dilution.

The composition of above was then vaporized into a 65 m² closed hair salon room. After about 30 min, the permanent reshaping service was commenced at a frequency of about once every 1 h, and additionally oxidative dyeing treatments emitting ammonia odor was performed in parallel at a frequency of about once every 1 h.

As a result, the amount of fragrance compounds vaporized per hour with respect to the size of space (m²) represented by the following formula 1 was 0.11 mg·hr$^{-1}$·m$^{-2}$.

(Amount of fragrance compounds vaporized per hour with respect to size of space [mg·hr$^{-1}$·m$^{-2}$])=(total weight ratio of the fragrance compounds $a$), $b$), $c$), and $e$) in the fragrance composition to be vaporized)·(vaporization rate of the fragrance composition [mg·hr$^{-1}$]/(size of space [m²])  (Formula 1)

(Condition)
Weight ratio of fragrance compounds in fragrance composition: 0.036
Vaporization rate of fragrance composition: 180 mg/hr
Size of space: 65 m²
9 customers were asked to rate the malodor when entering the closed room the first time.

The individuals were asked to rate with integer numbers between 0 and 5 with 0 corresponding to "no chemical odor" and 5 corresponding to "strong, stringent, and stinging chemical odor". The median number of their evaluation is reported below:
  100% of the customers answered that they could not smell any chemicals and that their perception was that no chemical services were performed.

Examples 4 to 22

Fragrance compositions having the formulations shown in Table 3 to 6 were prepared and evaluated for "odor masking property", "comfort of scent upon vaporizing", and "Freshness of scent".

(Preparation of Sulfur and Ammonia Odor Sample)
The aqueous reducing composition and the aqueous alkaline composition used in Example 1 were mixed in equal amounts to prepare a mixture. Cotton balls No. 14 (AS ONE Corporation) were impregnated with 30 μL of the mixture, enclosed in a Terumo Syringe SS-50ESZ (Tokyo Garasu Kikai Co., Ltd.) and left for stand for 1.5 hr. The gas in an amount of 5 mL with in the syringe was injected into a mini cup 500 (BIG Co., Ltd., 500 mL) having a hole such that the tip of syringe can be inserted, to thereby prepare a sulfur and ammonia odor sample.

(Preparation of Evaluation Sample)
A closed room (length×width×height=110 cm×110 cm×225 cm) having a window at a position 91 cm to 139 cm above the floor was prepared. Using an atomizer (Nozzle: MICOFOG MINI MF0005 (Nozzle Network Co., Ltd.), Pump: mini air pump (SITO MOTOR Co., Ltd.)), the fragrance composition was dispensed into the closed room through the window, the window was closed, and the room was left for stand for 1 minute, to thereby fill the closed space with the odor substances. The resulting was used as an evaluation sample.

(Sensory evaluation method) Sensory evaluation was carried out by three specialized panelists. After filling the closed room with the scent, the panelists entered the room, sniffed the prepared sulfur and ammonia odor sample, and evaluated for "odor masking property", "comfort of scent upon vaporizing", and "Freshness of scent" according to the evaluation scale in 0.5 increments. The additive mean value of scores from three panelists was used as evaluation score.

"Odor masking property"
  0: No odor
  1: Odor that can be barely detected (detection intensity)
  2: Weak odor but what the odor can be perceived (perception intensity)
  3: Odor that can be easily perceived
  4: Strong odor
  5: Very strong odor "Comfort of scent upon vaporizing"
  0: No sent is felt.
  1: Scent is weak, and not felt comfortable.
  2: Scent is relatively weak, but felt comfortable.
  3: Scent harmonizes with moderate intensity, and felt comfortable.
  4: Scent is relatively strong, and poor in comfort.
  5: Scent is strong, and felt stimulating and uncomfortable.

"Freshness of scent"
  −2: Weak freshness
  −1: Relatively weak freshness
  0: Moderate freshness
  +1: Relatively irritated, but moderate freshness
  +2: Stimulating and impaired freshness

TABLE 3

| | Weight % | Reference Example No fragrance | Example 4 | Example 5 | Example 6 | Example 7 | Example 8 | Example 9 | Example 10 |
|---|---|---|---|---|---|---|---|---|---|
| a) | p-Mentha-8-thiol-3-one | 0 | 0.0015 | 0.0045 | 0.0075 | 0.015 | 0.0225 | 0.039 | 0.0045 |
| b) | cis-3-Hexenol | 0 | 0.25 | 0.75 | 1.25 | 2.5 | 3.75 | 6.5 | 0.75 |
| c) | cis-3-Hexenyl acetate | 0 | 0.06 | 0.18 | 0.3 | 0.6 | 0.9 | 1.56 | 0.18 |
| e) | Allyl amyl glycolate | 0 | 0.05 | 0.15 | 0.25 | 0.5 | 0.75 | 1.3 | 0.15 |
| Total amount of a) to e) | | 0 | 0.3615 | 1.0845 | 1.8075 | 3.615 | 5.4225 | 9.399 | 1.0845 |
| Solvent | Dipropylene glycol | 100 | 9.64 | 8.92 | 8.19 | 6.39 | 4.58 | 0.60 | 8.92 |
| | Ethanol | 0 | Balance | Balance | Balance | Balance | Balance | Balance | 0 |
| | Isopropyl myristate | 0 | 0 | 0 | 0 | 0 | 0 | 0 | Balance |
| Total amount of a) to e) and solvent | | 100 | 100 | 100 | 100 | 100 | 100 | 100 | 100 |
| Ratio of fragrance compounds | a/b | — | 0.006 | 0.006 | 0.006 | 0.006 | 0.006 | 0.006 | 0.006 |
| | c/b | — | 0.24 | 0.24 | 0.24 | 0.24 | 0.24 | 0.24 | 0.24 |
| | e/b | — | 0.2 | 0.2 | 0.2 | 0.2 | 0.2 | 0.2 | 0.2 |
| Evaluation | Odor masking property | 3 | 2.3 | 2.0 | 1.8 | 0.3 | 0.2 | 0.0 | 2.2 |
| | Comfort of scent upon vaporizing | c | 1.7 | 1.9 | 2.0 | 3.2 | 3.3 | 3.3 | 1.9 |
| | Freshness of scent | — | 1.2 | 1.2 | 1.2 | 1.2 | 1.2 | 1.2 | 1.2 |

TABLE 4

| | Weight % | Example 11 | Example 7 | Example 12 |
|---|---|---|---|---|
| a) | p-Mentha-8-thiol-3-one | 0.001 | 0.015 | 0.025 |
| b) | cis-3-Hexenol | 2.5 | 2.5 | 2.5 |
| c) | cis-3-Hexenyl acetate | 0.6 | 0.6 | 0.6 |
| e) | Allyl amyl glycolate | 0.5 | 0.5 | 0.5 |
| Total amount of a) to e) | | 3.601 | 3.615 | 3.625 |
| Solvent | Dipropylene glycol | 6.40 | 6.39 | 6.38 |
| | Ethanol | Balance | Balance | Balance |
| Total amount of a) to e) and solvent | | 100 | 100 | 100 |
| Ratio of fragrance compounds | a/b | 0.0004 | 0.006 | 0.01 |
| | c/b | 0.24 | 0.24 | 0.24 |
| | e/b | 0.2 | 0.2 | 0.2 |
| Evaluation | Odor masking property | 0.7 | 0.3 | 0.0 |
| | Comfort of scent upon vaporizing | 2.5 | 3.2 | 3.3 |
| | Freshness of scent | 1.2 | 1.2 | 1.2 |

TABLE 5

| Weight % | | Comparative Example 1 | Example 13 | Example 14 | Example 15 | Example 16 | Example 17 | Example 18 | Example 19 | Comparative Example 2 |
|---|---|---|---|---|---|---|---|---|---|---|
| a) | p-Mentha-8-thiol-3-one | 0.015 | 0.015 | 0.015 | 0.0108 | 0.0108 | 0.0072 | 0.0036 | 0.0036 | 0.015 |
| b) | cis-3-Hexenol | 2.5 | 2.5 | 2.5 | 1.8 | 1.8 | 1.2 | 0.6 | 0.6 | 0 |
| c) | cis-3-Hexenyl acetate | 0 | 0.4 | 0.5 | 0.9 | 1.8 | 2.4 | 3 | 3.2 | 3 |
| e) | Allyl amyl glycolate | 0.5 | 0.5 | 0.5 | 0.36 | 0.36 | 0.24 | 0.12 | 0.12 | 0.5 |
| Total amount of a) to e) | | 3.0 | 3.415 | 3.515 | 3.0708 | 3.9708 | 3.8472 | 3.7236 | 3.9236 | 3.515 |
| Solvent | Dipropylene glycol | 7.00 | 6.58 | 6.49 | 6.93 | 6.03 | 6.15 | 6.28 | 6.08 | 6.49 |
| | Ethanol | Balance | Balance | Balance | Balance | Balance | Balance | Balance | Balance | Balance |
| Total amount of a) to e) and solvent | | 100 | 100 | 100 | 100 | 100 | 100 | 100 | 100 | 100 |
| Ratio of fragrance compounds | a/b | 0.006 | 0.006 | 0.006 | 0.006 | 0.006 | 0.006 | 0.006 | 0.006 | — |
| | c/b | 0 | 0.16 | 0.2 | 0.5 | 1 | 2 | 5 | 5.33 | — |
| | e/b | 0.2 | 0.2 | 0.2 | 0.2 | 0.2 | 0.2 | 0.2 | 0.2 | — |
| Evaluation | Odor masking property | 0.7 | 0.3 | 0.3 | 0.3 | 0.2 | 0.3 | 0.3 | 0.3 | 0.7 |
| | Comfort of scent upon vaporizing | 3.7 | 2.7 | 3.2 | 2.5 | 3.0 | 3.2 | 2.7 | 2.7 | 2.7 |
| | Freshness of scent | 3.0 | 1.7 | 1.3 | 0.7 | 0.0 | −0.3 | −1.0 | −1.7 | −3.0 |

TABLE 6

|   |   | Examples | | | |
|---|---|---|---|---|---|
|   | Weight % | 20 | 21 | 7 | 22 |
| a) | p-Mentha-8-thiol-3-one | 0.015 | 0.015 | 0.015 | 0.015 |
| b) | cis-3-Hexenol | 2.5 | 2.5 | 2.5 | 2.5 |
| c) | cis-3-Hexenyl acetate | 0.6 | 0.6 | 0.6 | 0.6 |
| e) | Allyl amyl glycolate | 0.01 | 0.2 | 0.5 | 0.8 |
| Total amount of a) to e) | | 3.125 | 3.315 | 3.615 | 3.915 |
| Solvent | Dipropylene glycol | 6.88 | 6.69 | 6.39 | 6.08 |
|  | Ethanol | Balance | Balance | Balance | Balance |
| Total amount of a) to e) and solvent | | 100 | 100 | 100 | 100 |
| Ratio of fragrance composition | a/b | 0.006 | 0.006 | 0.006 | 0.006 |
|  | c/b | 0.24 | 0.24 | 0.24 | 0.24 |
|  | e/b | 0.004 | 0.08 | 0.2 | 0.32 |
| Evaluation | Odor masking property | 0.7 | 0.5 | 0.3 | 0.0 |
|  | Comfort of scent upon vaporizing | 2.5 | 2.8 | 3.2 | 3.7 |
|  | Freshness of scent | 1.2 | 1.2 | 1.2 | 1.2 |

Formulation Examples 1 to 2

Formulation examples of the fragrance composition of the present invention are shown below.

|   |   | Formulation Examples | | | | | | | | | |
|---|---|---|---|---|---|---|---|---|---|---|---|
|   | Weight % | 1 | 2 | 3 | 4 | 5 | 6 | 7 | 8 | 9 | 10 |
| a) | p-Mentha-8-thiol-3-one | 0.015 | 0.015 | 0.015 | 0.015 | 0.015 | 0.016 | 0.015 | 0.015 | 0.015 | 0.015 |
| b) | cis-3-Hexenol | 2.500 | 2.500 | 2.500 | 2.500 | 2.500 | 2.750 | 2.500 | 2.500 | 2.500 | 2.500 |
| c) | cis-3-Hexenyl acetate | 0.600 | 0.600 | 0.600 | 0.600 | 0.600 | 0.660 | 0.600 | 0.600 | 0.600 | 0.600 |
| e) | Allyl amyl glycolate | 0.500 | 0.500 | 0.500 | 0.500 | 0.500 | 0.550 | 0.500 | 0.500 | 0.500 | 0.500 |
|  | Limonene | 20.000 | 40.000 | 50.000 | 52.300 | 53.000 | 55.050 | 14.335 | 9.425 | 7.200 | 3.100 |
|  | Linalool | 5.000 | 15.000 | 15.000 | 15.700 | 16.000 | 16.520 | 4.960 | 3.100 | 1.500 | 1.100 |
|  | Linalyl acetate | 3.000 | 7.500 | 7.500 | 7.865 | 7.865 | 8.274 | 2.500 | 1.200 | 1.200 | 0.800 |
|  | Floropal ™ | 1.000 | 3.000 | 3.000 | 3.200 | 3.200 | 3.300 | 1.000 | 0.400 | 0.500 | 0.300 |
|  | Citral | 1.500 | 4.500 | 4.500 | 4.700 | 4.700 | 4.950 | 1.500 | 1.000 | 0.500 | 0.460 |
|  | cis-3-Hexenyl salicylate | 1.000 | 3.000 | 3.000 | 3.150 | 3.150 | 3.300 | 1.000 | 0.600 | 0.250 | 0.300 |
|  | Methyl dihydrojasmonate | 1.000 | 3.000 | 3.000 | 3.140 | 3.140 | 3.300 | 1.000 | 0.600 | 0.200 | 0.300 |
|  | Aldehyde C-8 | 0.100 | 0.100 | 0.100 | 0.110 | 0.110 | 0.110 | 0.030 | 0.020 | 0.015 | 0.005 |
|  | Aldehyde C-9 | 0.100 | 0.100 | 0.100 | 0.110 | 0.110 | 0.110 | 0.030 | 0.020 | 0.010 | 0.010 |
|  | Aldehyde C-10 | 0.100 | 0.100 | 0.100 | 0.110 | 0.110 | 0.110 | 0.030 | 0.020 | 0.010 | 0.010 |
| Solvent | Water | 1.000 | — | — | — | — | — | — | — | — | — |
| Solvent | Dipropylene glycol | 62.585 | 20.085 | 10.085 | 6.000 | 5.000 | 1.000 | — | — | — | — |
| Solvent | Isopropyl myristate | — | — | — | — | — | — | 70.000 | 80.000 | 85.000 | 90.000 |
| Total |  | 100 | 100 | 100 | 100 | 100 | 100 | 100 | 100 | 100 | 100 |

The invention claimed is:

1. A fragrance composition for reducing malodor during chemical treatments of keratin fibers, the fragrance composition comprising:

p-mentha-8-thiol-3-one in the range of 0.001% to 0.05% by weight;

cis-3-hexenol in the range of 0.1% to 8% by weight;

cis-3-hexenyl acetate in the range of 0.1% to 5% by weight;

allyl amyl glycolate in the range of 0.01% to 3% by weight; and one or more organic solvents selected from the group consisting of benzyl alcohol, dipropylene glycol, isopropyl myristate, and ethanol in an amount of 1% to 99% by weight calculated to the total weight of the composition, wherein a weight ratio of cis-3-hexenyl acetate to cis-3-hexenol, cis-3-hexenyl acetate/cis-3-hexenol, is in the range of 0.16 to 5.33.

2. The composition according to claim 1, wherein the concentration of p-mentha-8-thiol-3-one is in the range of 0.01% to 0.0175% by weight, calculated to the total weight of the composition.

3. The composition according to claim 1, wherein the concentration of cis-3-hexenol is in the range of 1% to 2.6% by weight, calculated to the total weight of the composition.

4. The composition according to claim 1, wherein the concentration of cis-3-hexenyl acetate is in the range of 0.7% to 1.5% by weight, calculated to the total weight of the composition.

5. The composition according to claim 1, wherein the concentration of allyl amyl glycolate is in the range of 0.3% to 0.75% by weight, calculated to the total weight of the composition.

6. The composition according to claim 1, wherein the total concentration of the one or more organic solvents is in the range of 40% to 80% by weight, calculated to the total weight of the composition.

7. The composition according to claim 1, wherein a water content is 10% by weight or less, calculated to the total weight of the composition.

8. An absorbent solid substrate which is impregnated with the composition as defined in claim 1.

9. The absorbent solid substrate according to claim 8, wherein the absorbent solid substrate is a sheet, a particle, a plurality of particles, or a sponge.

10. A fragrance container for a scent dispenser, comprising:
- a container body configured to store fragrance compositions;
- one or more outlets for liquid and/or gas;
- optionally a container seal for sealing the one or more outlets of the container; and
- the fragrance composition as defined in claim 1.

11. The fragrance container according to claim 10, wherein the fragrance composition is further diluted with one or more organic solvents, in a weight ratio of fragrance composition to the one or more organic solvents in the range of 1:1 to 1:100.

12. The fragrance container according to claim 10, wherein the container body is configured to store an absorbent solid substrate that is impregnated with the fragrance composition.

13. The fragrance container according to claim 10, wherein the container body is configured to store liquid fragrance compositions.

14. A scent dispenser for dispensing fragrance into the air of partially-closed rooms, the scent dispenser comprising the fragrance composition of claim 1.

15. The scent dispenser according to claim 14, wherein the scent dispenser is an aerosol vaporizer or a pump vaporizer.

16. The scent dispenser according to claim 14, wherein the scent dispenser is an electric scent dispenser further comprising:
- a body having one or more dispensing means for continuously or sequentially dispensing fragrance compositions;
- one or more electrical power connections and/or one or more electrical power sources for providing electrical power to the one or more dispensing means, and
- a refillable and/or exchangeable container, comprising:
  - a container body configured to store fragrance compositions;
  - one or more outlets for liquid and/or gas;
  - optionally a container seal for sealing the one or more outlets of the container; and
  - the fragrance composition.

17. The scent dispenser according to claim 16, wherein the one or more dispensing means is one or more vaporizing means comprising at least one selected from the group consisting of a venturi nozzle, an ultrasonic vibrator, a jet vaporizer, and a vibrating mesh vaporizer.

18. A method for reducing malodor during chemical treatments of keratin fibers in closed rooms, the method comprising:
i) vaporizing the composition of claim 1 into the air of the closed room; and
ii) treating keratin fibers with one or more permanent and/or semi-permanent chemical treatments in the same closed room,
wherein step i) may be performed prior to and/or during step ii).

19. The method according to claim 18, wherein in step i), the amount of fragrance compounds vaporized per hour with respect to the size of space ($m^2$) represented by the following Formula 1 is 0.01 to 5 $mg \cdot hr^{-1} \cdot m^{-2}$.

$$\text{(Amount of fragrance compounds vaporized per hour with respect to size of space } [mg \cdot hr^{-1} \cdot m^{-2}]) = \text{(total weight ratio of p-mentha-8-thiol-3-one, cis-3-hexenol, cis-3-hexenyl acetate, and allyl amyl glycolate in the fragrance composition to be vaporized)} \cdot \text{(vaporization rate of the fragrance composition } [mg \cdot hr^{-1}]/(\text{size of space } [m^2]) \quad \text{(Formula 1)}.$$

20. The method according to claim 18, wherein the one or more permanent and/or semi-permanent chemical treatments are selected from the group consisting of:
- a permanent shaping treatment for keratin fibers, comprising applying a composition comprising one or more sulfur-based reducing agents and optionally an ammonia and/or ammonium salt,
- a permanent shaping treatment for keratin fibers, comprising applying an alkaline composition comprising ammonia and/or one or more ammonium salts, and heating the keratin fibers in a temperature range from 50° C. to 180° C.,
- a permanent and/or semi-permanent oxidative dyeing and/or bleaching treatment for keratin fibers, comprising applying a composition comprising an ammonia and/or ammonium salt, and
- a semi-permanent keratin fiber straightening treatment, comprising applying an acidic composition comprising glyoxylic acid followed by heating the keratin fibers at a temperature range from 50° C. to 230° C.

21. The method according to claim 18, wherein step i) commences at least 10 min prior to step ii), and
wherein the composition is continuously or sequentially vaporized during the treatment processes of step ii).

* * * * *